(12) United States Patent  
Hutchings

(10) Patent No.: US 6,305,221 B1
(45) Date of Patent: Oct. 23, 2001

(54) ROTATIONAL SENSOR SYSTEM

(75) Inventor: Lawrence J. Hutchings, Castro Valley, CA (US)

(73) Assignee: Aeceleron Technologies, LLC, CA (US)

(*) Notice: Subject to any disclaimer, the term of this patent is extended or adjusted under 35 U.S.C. 154(b) by 0 days.

(21) Appl. No.: 09/332,794

(22) Filed: Jun. 14, 1999

Related U.S. Application Data

(60) Division of application No. 09/212,766, filed on Dec. 16, 1998, now Pat. No. 6,122,960, which is a continuation-in-part of application No. 08/877,342, filed on Jun. 17, 1997, now Pat. No. 5,899,963, which is a continuation-in-part of application No. 08/570,759, filed on Dec. 12, 1995, now Pat. No. 5,724,265.

(51) Int. Cl.$^7$ ............................................ G01P 15/08

(52) U.S. Cl. ................................ 73/488; 73/510

(58) Field of Search ......................... 73/488, 489, 490, 73/493, 510, 865.4; 702/145, 146, 141, 142, 150, 151, 160; 235/105

(56) References Cited

U.S. PATENT DOCUMENTS

| | | | |
|---|---|---|---|
| 3,789,402 | 1/1974 | Heywood et al. | 340/384 |
| 3,797,010 | 3/1974 | Adler et al. | 340/323 |
| 3,865,305 | 2/1975 | Sampey | 235/92 |
| 4,053,755 | 10/1977 | Sherrill | 364/561 |
| 4,094,199 | 6/1978 | Holdren et al. | 73/517 |
| 4,180,726 | 12/1979 | DeCrescent | 250/222 |
| 4,220,996 | 9/1980 | Searcy | 364/561 |
| 4,312,358 | 1/1982 | Barney | 128/670 |
| 4,334,190 | 6/1982 | Sochaczevski | 324/171 |
| 4,371,945 | 2/1983 | Karr et al. | 364/561 |
| 4,387,437 | 6/1983 | Lowrey et al. | 364/561 |
| 4,449,191 | 5/1984 | Mehnert | 364/559 |
| 4,460,823 | 7/1984 | Ruehlemann | 235/105 |
| 4,560,861 | 12/1985 | Kato et al. | 235/105 |
| 4,571,680 | 2/1986 | Wu | 364/410 |
| 4,578,769 | 3/1986 | Frederick | 364/565 |
| 4,627,011 | 12/1986 | Spencer et al. | 364/566 |
| 4,630,226 | 12/1986 | Tanaka | 364/561 |
| 4,703,445 | 10/1987 | Dassler | 364/561 |
| 4,736,312 | 4/1988 | Dassler et al. | 364/561 |
| 4,741,008 | 4/1988 | Franke | 378/53 |

(List continued on next page.)

FOREIGN PATENT DOCUMENTS

| | | |
|---|---|---|
| 4222373 | 1/1994 | (DE) . |
| 2670004 | 6/1992 | (FR) . |

OTHER PUBLICATIONS

Herbert Goldstein, "Classical Mechanics" Harvard University, Addison–Wesley Publishing, 1959.
AGARD, "Inertial Navigation Systems and Components" AGARD Conference Proceedings No. 43, NATO, 1968.
Kenneth R. Britting, "Inertial Navigation Systems Analysis" Massachusetts Institute of Technology, Wiley–Interscience 1971.

*Primary Examiner*—Helen Kwok
(74) *Attorney, Agent, or Firm*—Sofer & Haroun, LLP

(57) ABSTRACT

A device that measures the distance traveled, speed, and height jumped of a person while running or walking. Accelerometers and rotational sensors are placed in the sole of one shoe along with an electronic circuit that performs mathematical calculations to determine the distance and height of each step. A radio frequency transmitter sends the distance and height information to a wristwatch or other central receiving unit. A radio frequency receiver in the wristwatch or other unit is coupled to a microprocessor that calculates an output speed based upon step-distance and elapsed time, and the distance traveled of the runner from the sum of all previous step distances. The output of the microprocessor is coupled to a display that shows the distance traveled, speed, or height jumped of the runner or walker.

23 Claims, 14 Drawing Sheets

U.S. PATENT DOCUMENTS

| | | | |
|---|---|---|---|
| 4,763,287 | 8/1988 | Gerhaeuser et al. | 364/561 |
| 4,787,051 | 11/1988 | Olson | 364/518 |
| 4,821,218 | 4/1989 | Pötsch | 364/566 |
| 4,855,942 | 8/1989 | Bianco | 364/561 |
| 4,885,710 | 12/1989 | Hersberger et al. | 364/565 |
| 5,033,013 | 7/1991 | Kato et al. | 364/561 |
| 5,117,444 | 5/1992 | Sutton et al. | 377/24.2 |
| 5,181,181 | 1/1993 | Glynn | 364/566 |
| 5,206,652 | 4/1993 | Hoyt et al. | 342/52 |
| 5,245,537 | 9/1993 | Barber | 364/410 |
| 5,396,510 | 3/1995 | Wilson | 372/38 |
| 5,452,216 | 9/1995 | Mounce | 364/449 |
| 5,471,405 | 11/1995 | Marsh | 364/556 |
| 5,516,334 | 5/1996 | Easton | 482/8 |
| 5,524,637 | 6/1996 | Erickson | 128/779 |
| 5,574,669 | 11/1996 | Marshall | 364/569 |
| 5,583,776 | 12/1996 | Levi et al. | 364/450 |
| 6,122,960 * | 9/2000 | Hutchings et al. | 73/493 |

* cited by examiner

ROTATIONAL SENSOR SYSTEM

CROSS-REFERENCE TO RELATED APPLICATIONS

This application is a divisional application of application Ser. No. 09/212,766, entitled SYSTEM AND METHOD FOR MEASURING MOVEMENT OF OBJECTS filed on Dec. 16, 1998, now U.S. Pat. No. 6,122,960, which is a continuation-in-part of application Ser. No. 08/877,342 filed on Jun. 17, 1997 and issued as U.S. Patent No. 5,899,963 on May 4, 1999, which is a continuation-in-part of application Ser. No. 08/570,759 filed Dec. 12, 1995 and issued as U.S. Pat. No. 5,724,265 on Mar. 12, 1998.

FIELD OF THE INVENTION

This invention relates generally to the field of motion analysis and is particularly directed to a system and method for determining the speed, distance and height traversed by a person or an object while in motion, for navigation, and for three-dimensional tracking and analyzing the motion of moving objects.

BACKGROUND OF THE INVENTION

In recent years many individuals have turned to their own fitness program of regular jogging. As used herein, jogging is also intended to include running and walking and the words are used interchangeably. Jogging has long been recognized for its therapeutic effects on the body. It purportedly increases cardiopulmonary fitness, helps to lower blood pressure, decreases cholesterol and triglycerides associated with heart disease and reduces weight. Jogging is also one of the easiest exercises to do. It requires no athletic ability and can be done almost any time and any place with a minimum of equipment and without assistance. In more recent times, jogging has also gained acceptance for its recreational value as well and is recognized as a positive factor in promoting psychological well being.

The popularity of jogging today is well documented by the large numbers of products and literature available to the public. As in many exercise and sporting endeavors, there exists in the prior art a wide variety of devices for aiding those who jog. Many people who run, jog or walk regularly desire to know their progress over time. Therefore, it is desirable to know the accurate distance and speed traveled during an exercise session. This information allows a jogger to monitor his or her progress and accordingly pursue a regular course of exercise designed to enhance performance.

Further, it has become desirable to accurately measure the speed of amateur and professional runners, both in training and during competition. In the prior art, such measurements were made with a stopwatch timing the runner over a known distance. Heretofore, it has not been possible to obtain accurate instantaneous speeds of runners or height ascended or descended using the measuring devices currently known in the prior art.

The simplest jogging aids for measuring movements are basic pacing timers such as those disclosed in U.S. Pat. No. 3,540,344 to Veech and U.S. Pat. No. 3,882,480 to Greber. Pacing timers generate a repetitive audio tone signal at selected intervals for pacing the strides of the jogging, where the length of the interval between tones is adjusted to suit the pace of the individual jogger.

There are other running aids known in the prior art such as pedometers as disclosed in U.S. Pat. No. 4,053,755 to Sherrill. These devices usually count the number of steps taken and for a particular stride length, the approximate distance traversed can be determined.

Human speedometers and odometers that measure the speed and distance traveled by a person include devices that utilize ultrasound to measure the distance between each foot such as disclosed in U.S. Pat. No. 4,736,312 to Dassler. Also used is a device that measures the elapsed time of shoe in contact with the ground and converts this to the length of step and speed as disclosed In U.S. Pat. No. 4,578,769 to Frederick.

While pacing timers, pedometers, ultra sound, and elapsed foot-time-distance devices are useful to the runner and walker, they are deficient in several areas. For example, while ultra sound devices can measure the distance between two feet, this is not equivalent to the length of a step or a stride, which is defined as the distance traveled by the same foot from the beginning of a stride till the end of the same stride. For example, the difference between (1) separation between feet, as measured by the ultra sound device, and (2) stride length, is different for each person and will vary for different speeds of running.

Furthermore, devices that employ elapsed-foot-contact-time measurements, have significant errors in measuring stride length. It is known that above a certain speed, stride length begins to increase as speed increases, and the relationship of stride length to speed is not directly proportional, and moreover, is different for each runner. In addition, most of the devices mentioned above require calibration, which may prove to be a difficult task. For example, many of these devices need to be calibrated by the manufacturer or by specially designed equipment.

It is, therefore, a difficult task to determine the correct stride length for an individual runner at various speeds. Thus, pacing timers can provide no more than a constant running pace, and pedometer measurements are only useful as an approximation of distance traversed. Also, ultra sound and elapsed-foot-time-distance devices provide only a rough approximation of actual distance traveled and speed of the person. Also, none of the prior art includes a measurement of height jumped. Running and walking aids known in the prior art are often deficient and cumbersome to use and they often add weight to the runner or walker while providing only marginal utility in terms of the amount of information available and its accuracy.

The need to track the movement of objects extends to many applications such as any object moving in a 1-, 2-, or 3-dimensional environment. This includes objects such as vehicles, animals, robots, machine parts, limbs/extremities. It may also include other objects where the motion analysis capabilities of this invention may be applied to measure and analyze data captured such as speed, distance, acceleration, velocity, angle of rotation, number of cycles of rotational movement, position relative to a known reference frame, and direction of movement.

With the foregoing in mind, there is a desire for an improved tracking device that should: be light in weight; serve a number of useful functions; be inexpensive; be relatively small in size; be wearable or easily insertable or attachable; provide measurements that are readily available to the user; be reliable and easy to use; and provide accurate measurements of speed, distance traversed, height jumped, and other useful information relating to a motion of an object.

OBJECT OF THE INVENTION

It is the overall objective of this invention to provide a new and improved motion analysis measuring system, which overcomes the disadvantages of the prior art devices and substantially increases the amount and accuracy of information available to users such as joggers.

A specific objective of this invention is to provide a new and improved running and walking measuring system, in which the speed of the runner can be easily and accurately determined.

A further specific objective of this invention is to provide a new and improved running and walking measuring system, in which the distance traversed by a runner can be easily and accurately determined.

Another specific objective of this invention is to provide a new and improved running measuring system, in which the height jumped by a runner or a jogger can be easily determined.

Another specific objective of this invention is to provide a new and improved running measuring system, in which the elevation change by a runner or jogger can be easily determined.

Another specific objective of this invention is to utilize magnetometers to provide the direction of travel relative to magnetic north.

In accordance with another aspect of the invention, the measuring system can utilize magnetometers along with gravity measurements to determine the rotation of the device.

Another specific objective of this invention is to utilize magnetometers along with rotation sensors and linear accelerometers that provide signals, which are low passed filtered to obtain gravity tilt measurements, along with unfiltered signals provided by linear accelerometers to configure a system that has up to twelve-degrees of freedom resulting in multiple measurement information and improved accuracy.

Another specific objective of this invention is to provide a new and improved running measuring system that can be utilized for navigation of a person or an object within an earth (or local global) coordinate system.

Another specific objective of this invention is to couple it with a Global Positioning Systems (GPS) to determine the location on the earth of a person, animal or object.

Another specific objective of this invention is to couple it with radar to identify the location of objects relative to the device, and to navigate around the objects.

Another specific objective of this invention is to utilize radar to identify whether objects along a potential path of travel path are metallic, wood, or flesh.

Another specific object of the invention is to couple it with a synthetic voice system to communicate this to the user with a voice synthesis system or an alarm.

Another specific objective of this invention is to provide a new and improved three-dimensional tracking and motion measuring system of persons, extremities, limbs, or objects, in which the path, direction and position data captured by the sensors and associated with the motion measured can be graphically presented in real-time or stored for later display and analysis.

Another specific objective of this invention is to provide a new and improved accuracy of a measuring system by employing clusters of measuring devices, so that the information gathered can be deemed redundant and random errors are averaged out.

Another specific objective of this invention is to provide a new and improved accuracy of a measuring system by employing neural-networks.

A still further objective of this invention is to provide a new and improved running and walking and general motion measuring system having the above advantages which is light in weight, relatively inexpensive and convenient to use.

SUMMARY OF THE INVENTION

In accordance with one aspect of the invention, a device for measuring the performance of people or objects utilizes accelerometers and rotational sensors to measure the speed, distance traveled, and height ascended or descended. It may be attached to the sole of a shoe to measure the length of each step, and the sum of steps can be used to calculate the distance traveled. The sum distance of a number of previous steps divided by the elapsed time is used to calculate the velocity. In another aspect of the invention, it may be attached to any part of the body or object and information signals may be transmitted to the user's watch or other means for display.

In order to alleviate the measurement errors caused by employing the measuring system, the system sets a reference frame coordinate system that maintains the same orientation during a cycle. A cycle is a period of time over which a discrete measurement is made, such as a step. A translation coordinate system moves with the device and is aligned with the sensors. One set of three-component linear accelerometers and one set of three-component rotational sensors record motions in the translation coordinate system. Magnetometers may also be employed as described below. An indication signal may be configured to identify the beginning and end of a cycle. Accelerations recorded in the translation coordinate system are transformed to the reference frame coordinate system. Time is incorporated in the device so that accelerations may be integrated. The length of travel during a cycle is obtained by integrating twice. Once the length of motion during a cycle is determined, the elapsed time is used to obtain the speed of the person or object. The maximum value of the vertical displacement is used to determine the height ascended, or jumped, or descended during a cycle. The sum length of several cycles is used to obtain the distance traveled and the total elevation change.

Preferably, in order to alleviate the effects of gravitational field on the accelerometers, the system initiates a new cycle at a time when the velocity of the user is constant and the measured acceleration is influenced substantially by gravity. Gravity measurements obtained at the beginning of a cycle are utilized to correct for the effect of gravity in the reference frame during the cycle.

Another specific aspect of this invention is to utilize magnetometers to provide the direction of travel relative to magnetic north within a global coordinate system. A global coordinate system is one that does not change over time, such as an earth coordinate system or a grid within a city or a golf course. At a time when the reference frame coordinate system is oriented such that one axis is parallel with the gravity vector, the other two magnetometers aligned along the other two axes provide a signal that corresponds to a compass direction of declination from magnetic north. The third magnetometer aligned along the gravity vector provides a value to calculate the inclination, or the angle of the magnetic field with the earth's surface. The declination can be utilized to provide a direction of travel relative to the earth's magnetic north or to another global coordinate system.

In accordance with another aspect of the invention, the measuring system can utilize magnetometers along with gravity measurements to determine the rotation of the device. In situations where the apparent acceleration of the device is primarily due to the affect of tilt in the gravity field or the rate of tilt is at a lower frequency than the changes in linear accelerations of the device, then the linear acceleration signals can be low pass filtered such that the accelerations due to tilt in the gravity field are primarily measured. In situations where the rate of tilt is much slower than the rate of change of linear accelerations and the amplitude of acceleration due to tilt is also much larger than that due to linear accelerations of the device, errors in using accelerations signals to calculate rotation are minimal.

In accordance with another embodiment of the invention, rotation rate sensors or rotational accelerometers are also utilized along with linear accelerometers and magnetometers, leading to a system with 9 degrees of freedom. If the linear acceleration signals are low passed filtered for gravity tilt measurements and linear accelerations due to the device are utilized separately, then the system utilizes six degrees of acceleration signal and constitutes a twelve degree of freedom system.

Another specific aspect of this invention is to provide a new and improved measuring system that can be utilized for navigation of a person or an object. Navigation begins at an initiation point where the location of the person or object is known within a global coordinate system. The basic approach to navigation is to use the device to calculate the distance and direction of travel and keep track of location within the global coordinate system. Accuracy is improved by measuring position over segments of movement. At the initiation of a cycle of measurement the reference frame coordinate system is transformed to a global coordinate system. At the end of each cycle, the vector solution in the global coordinates system is determined and new position in the global coordinate system is calculated.

Another specific aspect of this invention is to couple a measuring system in accordance with one embodiment of the invention with a Global Positioning Systems (GPS) to determine the location on the earth of a person, animal or object. At the beginning of navigation the position within an earth coordinates system is determined, and at the end of each cycle, the vector solution in the earth's coordinates system is determined and the new position in the global coordinate system is calculated. Periodically, at the beginning of a cycle, a new position within the earth's coordinate system is determined from a GPS and the accuracy is improved by updating the navigation position determined by the device.

Another specific aspect of this invention is to couple a measuring system in accordance with one embodiment of the invention with radar to navigate around objects. A radar system is adjusted for aperture and distance range to identify the location of objects relative to the device along a potential path of travel, and the device can be used to navigate around them. Further, radar signal recognition can be utilized to identify whether the object is metallic, wood, or flesh from radar signals.

Another specific aspect of the invention is to couple it with a synthetic voice system. A synthetic voice system can sound the alarm if one approaches an object, or can identify the type of object identified in radar signals.

Another specific aspect of this invention is to provide a new and improved three-dimensional tracking system of persons, extremities, or objects that can be stored for detailed analysis.

Acceleration, velocity, and displacement is known as a function of time within a specified global or reference frame coordinates system. Typically the entire path of a running or walking excursion within a global coordinate system, or a golf swing, running stride, or swimming stroke within a reference frame coordinate system can be stored by the device.

Another specific objective of this invention is to provide a new and improved accuracy by employing clusters of the device, so that the information gathered is redundant and random errors that occur due to sensor inaccuracies can be reduced.

Another specific aspect of this invention is to provide a new and improved accuracy by employing neural-networks. For this invention, neural networks may be used to increase the accuracy of the computed distance or location by providing corrections based on characteristics of the measured sensor inputs. A neural network is a form of non-linear filter that can have its coefficients determined by a "training set" of empirical data. The training set is a collection of input data that produce known outcomes. The training set is used to produce a nonlinear network of filter coefficients that can determine the correct outcome from new input data. The exact nature of the corrections and the relationship of the corrections to the input data would be determined by training a neural network with empirical data having a known outcome.

A still further objective of this invention is to provide a new and improved running and walking and general motion measuring system having the above advantages which is light in weight, relatively inexpensive and convenient to use.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 1:
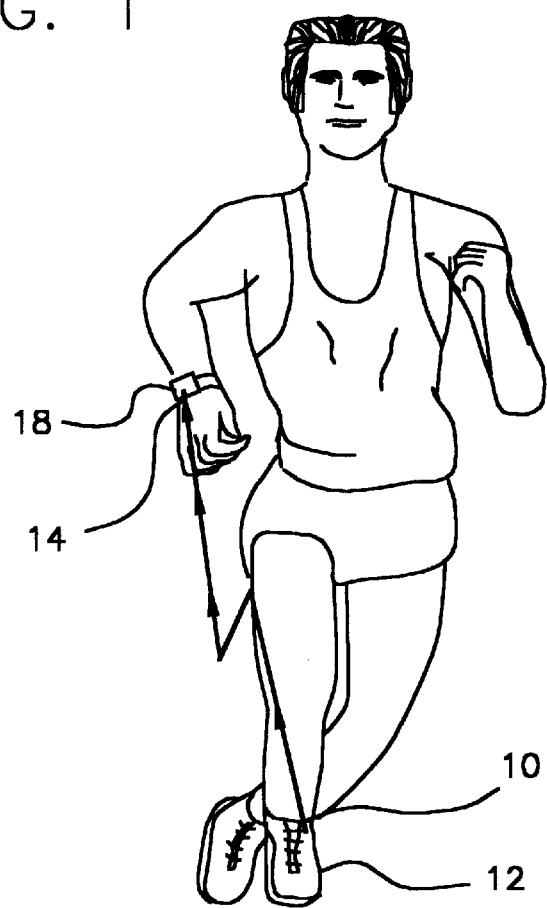
FIG. 1 illustrates one embodiment of the invention as employed by a user.

FIG. 1 shows an embodiment of a measuring system 10 as employed by a user, although the invention is not limited in scope to the location of different components of the system as illustrated herein. For example, the components of the measuring system may be located at other parts of the body, such as the wrist and the waist area. In accordance with the embodiment illustrated in FIG. 1, the shoe of the user may include interrelated elements such as linear accelerometers; rotational sensors; a microprocessor to calculate the distance and height of each step; a foot impact switch; battery; and a radio transmitter 12, as will be explained in more detail below.

As shown in FIG. 1, the user may wear a hand display having a radio receiver 14. The radio receiver may alternately be located at a remote site so that the performance of the runner can be monitored by another person. Incorporated into the receiving unit may be a microprocessor for processing the received signals into the speed of the runner, the distance traversed and the height jumped. The processed information may be selectively displayed on display 18. The hand display may also perform other functions; for example, it may selectively display normal watch functions, such as time of day, date, alarm and stop watch signals.

Figure 2:
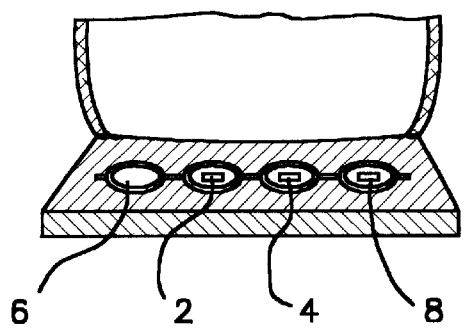
FIG. 2 illustrates the location of the system's components in the sole of the shoe, in accordance with an embodiment of the invention.

FIG. 2 shows one possible location of different components of the measuring system in the sole of the user's shoe. However, the invention is not limited in scope in this respect, and various components of the system in accordance with the present invention may be implemented in a variety of arrangements. Accelerometers 2, rotational sensors 4 and a contact switch 8 are preferably placed in the ball-of-the-foot portion of the sole of the shoe so that they may come in contact with the ground for each step during either walking or running. As it will explained in more detail below, the measuring system in accordance with the present invention may also operate without contact switch 8. Measuring system 10 may include three rotational sensors 4, each configured to measure the angle of the user's foot with respect to a reference frame as will be explained in more detail below. Rotational sensors 4 are well known, such as those provided by AMP model numbers ACH-04-08. Each rotational sensor converts the measured angle into a corresponding signal, which is employed by a microprocessor 6 to calculate information related to the user's movements, such as user's speed, distance traveled and the height jumped. It will be appreciated that the present invention is not limited in scope to the components illustrated in FIG. 2. For example, instead of contact switch 8, other means may be employed so as to generate a signal to indicate the beginning of each step.

Measuring system 10 preferably includes three accelerometers 2, each configured to measure the acceleration of the user's foot with respect to a reference frame as will be explained in more detail below. The accelerometers may also be located in the sole of the user's shoe. Accelerometers 2 are well known, such as those provided by Analog Devices model ADXL05. Each accelerometer may convert the measured acceleration into a corresponding signal, which may be preferably employed by microprocessor 6 to accomplish movement measurements.

Also, other components may be separated and placed in another portion of the shoe. For example, the measuring system may be placed at another location of the shoe or another location in the body of the user.

Figure 3:
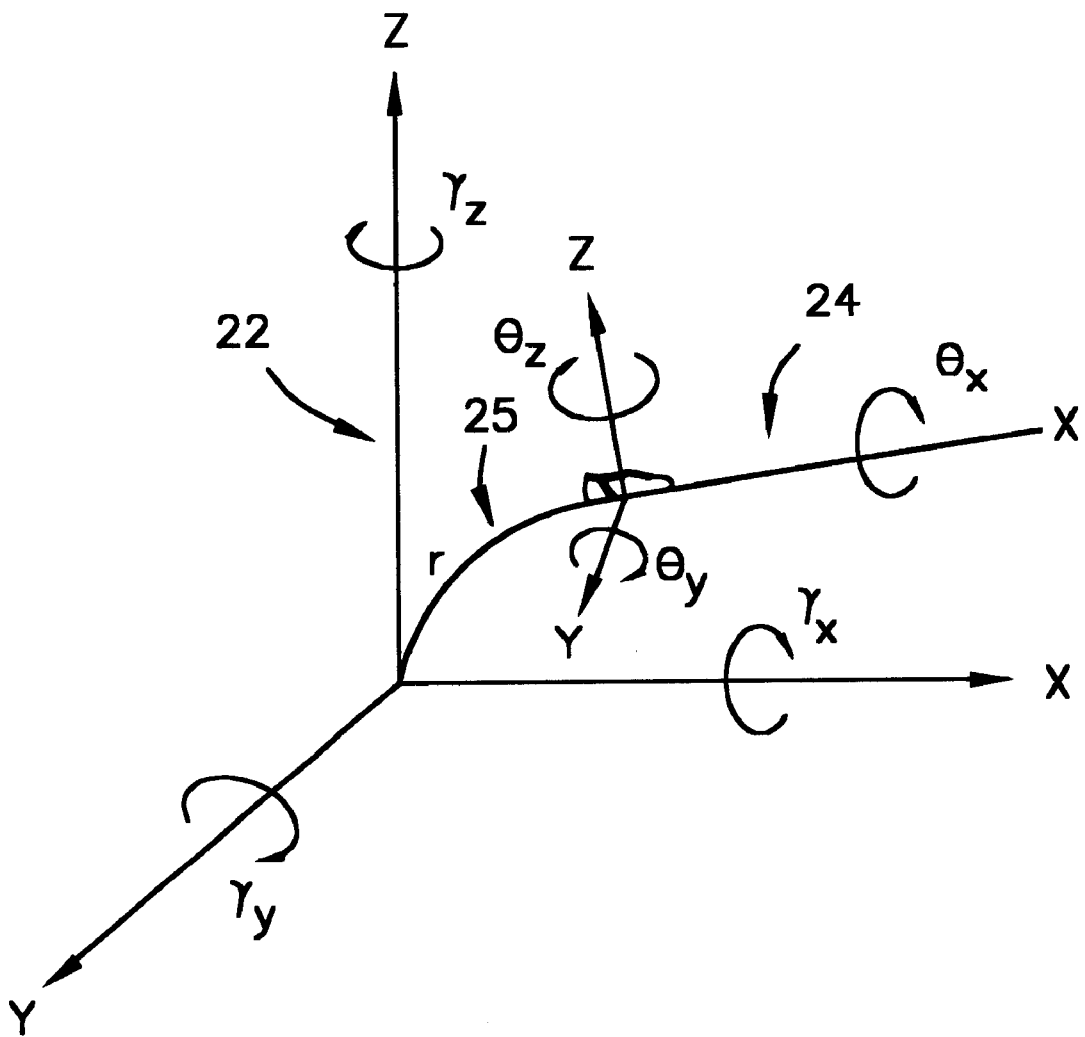
FIG. 3 is a coordinate system for the reference frame of the stationary ground, and the vectors of linear and rotational motion that are necessary to determine motion of the foot in accordance with one embodiment of the invention.

FIG. 3 illustrates a plot of the coordinate systems necessary to resolve step length and height. In the present context, a first coordinate system, such as (x, y, z) 22, is referred to as the reference frame coordinate system of the stationary ground. ($\gamma_x, \gamma_y, \gamma_z$, are the rotational coordinates about the x, y and z axes of the reference frame. In one embodiment of the invention, rotation about the z axis may not be measured. These values advantageously indicate the slope of the ground at the beginning of the step. Preferably, the reference frame coordinate system is reset at the initiation of a new step and remains stationary throughout the time the same foot leaves and touches the ground again. The orientation of the reference frame coordinate system with respect to the foot is arbitrary, but it is preferably selected so that at the beginning of the step the positive x direction may be aligned with the axis of the sole of the shoe, the positive y axis may be in the same plane as the sole and at right angles to the x axis, and the positive z axis may be normal to the plane of the sole of the shoe. The arrows in FIG. 3 indicate the direction of positive motion. The length and height of each step with respect to this coordinate system may be measured in accordance with the present invention as explained in more detail hereinafter. The reference frame coordinate system changes within each cycle.

FIG. 3 also illustrates a second coordinate system, such as (X, Y, Z) 24, referred to as the translational coordinate system of the linear accelerometers. This coordinate system moves with the foot and may be centered at the location of the sensors. FIG. 3 further illustrates rotational coordinates, such as ($\theta_x, \theta_y, \theta_z$) about the axes X, Y and Z. These rotational coordinates may be employed advantageously to keep track of the orientation of the (X, Y, Z) coordinate system relative to the (x, y, z) coordinate system, as will be explained below, and to resolve the accelerations along the reference frame.

In FIG. 3, an exemplary foot is shown part way through a step that moves along a trajectory r such as 25. The orientation of the translational coordinate system with respect to the foot is the same as described for the reference frame, but moves with the foot. Preferably, the reference and translational coordinate systems may be aligned together every time a new step is initiated. Furthermore, in accordance with another embodiment of the invention as explained in reference with FIGS. 7–9, the orientation of the reference frame and the translational coordinate system may be aligned at a beginning of a cycle which may comprise more than one step. Further, in accordance with another embodiment of the invention as explained in reference with FIGS. 10–12, the orientation of the reference frame coordinate with respect to the global coordinate system will be determined and absolute motion in the global reference frame is calculated, in accordance with another embodiment of the invention.

Figure 4:
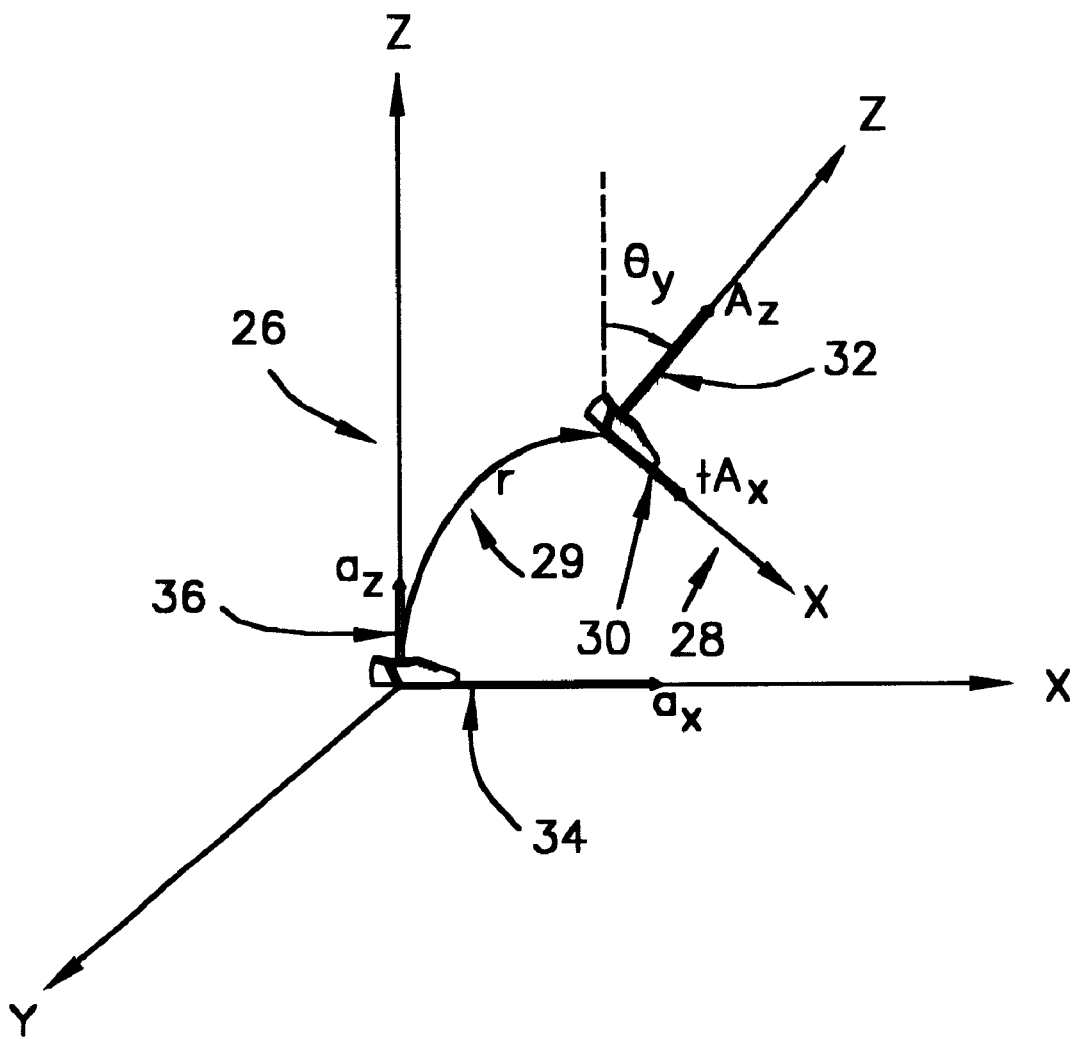
FIG. 4 is a side view diagram of the foot during running, illustrating information employed to resolve step length in two dimensions in accordance with one embodiment of the invention.

FIG. 4 illustrates an example of a motion of the foot and how the length of the step is resolved for a motion in one plane, along two dimensions (here, the plane of the paper), and for a step along a horizontal surface. The reference frame coordinate system 26 is that described as 22 in FIG. 3, and the translational coordinate system 28 is that described as 24 in FIG. 3. The foot is shown part way through a step having moved along trajectory r such as 29. The translational coordinate system is moving along trajectory r 29, as described in FIG. 3.

FIG. 4 also illustrates acceleration vectors ($A_x$, $A_z$) in the translational coordinate system. These accelerations are represented by arrows aligned along the X and Z axes of the translation coordinate system, respectively. The length of the arrows represent the amount of acceleration for each component (30 and 32, respectively). The angle of rotation about the y axis relative to the reference frame coordinate system is $\theta_y$. From these components of motion the acceleration relative to the reference frame coordinate system can be resolved. This is shown as $a_x$ and $a_z$ in the reference frame (34 and 36, respectively).

The amount of acceleration and its direction (a vector solution) is preferably employed to keep track of forward and reverse motions of the foot. For example, if motion remains in the (z, x) plane and the surface is horizontal (FIG. 4), then $$a_x = A_x \cos\theta_y + A_z \sin\theta_y \quad (1)$$

$$a_z = -A_x \sin\theta_y + A_z \cos\theta_y - g \quad (2)$$

Where g is the acceleration due to gravity, which is preferably considered as a factor due to the use of accelerometers; this follows because typically the accelerometers that may be employed by the measuring system are of the type that are affected by gravity. However, the invention is not limited in that scope. For example, if an accelerometer that is not influenced by gravity is employed then the g factor in equation (2) may be omitted. Gravity may be assumed to be a constant as explained in more detail below. Here, acceleration $a_z$ is assumed to be vertical and aligned with the orientation of gravity. However, the invention is not limited in that scope. For example, acceleration $a_z$ may be aligned at an angle from the direction of gravity, such as on a hill, as explained in more detail below. The –g factor added to the $a_z$ component of equation (2) is to balance the effect of gravity on the inertial accelerometers. For example, if the user of the system is standing still, $\theta_y=0$ and $A_z=+g$, then $a_z=0$. If the user is moving up at g, $A_z$ will read 2g, and $a_z=g$. If the user moves down at g and $\theta_y=180$, $A_z=0$, and $a_z=-g$. For forward horizontal motion, with, for example, $\theta_y=45°$, $A_z$ and $A_x$ would be positive and substantially equal from motion, but there would be an added positive component g $\cos\theta_y$ added to $A_z$ and an added negative g $\sin\theta_y$ component added to $A_x$, and their sum would be such that $a_z=0$. The length of the step is obtained by integration as discussed in reference with FIG. 5.

Figure 5:
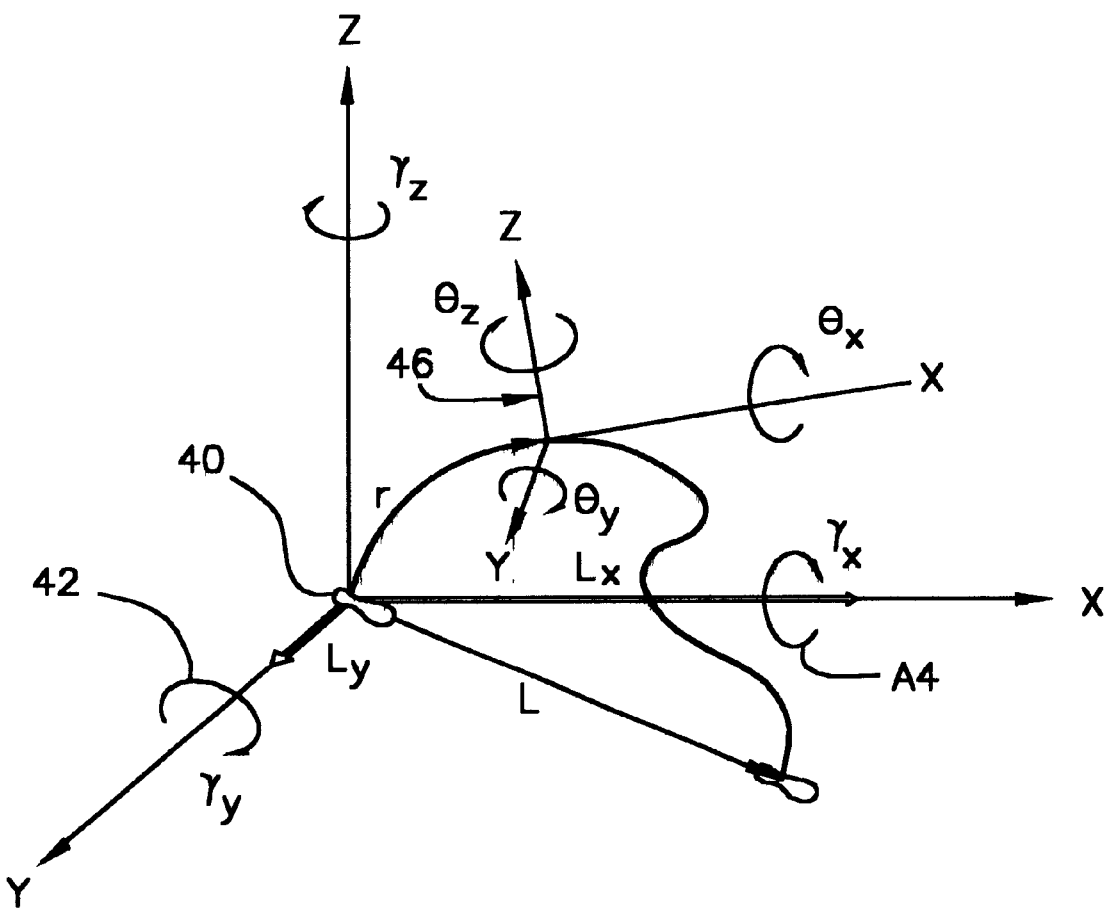
FIG. 5 is a vector diagram illustrating output acceleration, velocity and displacement of one embodiment of the invention during running.

FIG. 5 shows the elements that may be employed to obtain a complete solution of motion of the foot in three dimensions for an embodiment in or on the shoe. The reference frame is established from the foot contact at the beginning of a step 40. However the invention is not limited in scope in that respect, and in accordance with other embodiments of the invention, the reference frame may be established in other manners as explained in more detail below and in reference with FIGS. 6–8.

The reference frame z axis may be chosen such that it is not aligned with gravity. For example, the reference frame z axis may not be aligned with the direction of gravity if the ground (x, y plane) is not horizontal. In that event $\gamma_y$ 42 is the angle of the x axis in reference with a horizontal plane, and $\gamma_x$ 44 is the angle of the y axis in reference with the horizontal plane. These values are unknown, as they depend on the orientation of the reference frame in relation to the gravity, such as for example, the slope of the ground at the beginning of each step, and are calculated by measuring system 10, as explained below. At any point along the trajectory r, the components of motion in the reference frame can be determined from the linear accelerometers and rotational sensors in the translational coordinate system 46.

$$a_x = C_1 A_x + C_2 A_y + C_3 A_z - g \sin\gamma_x \quad (3)$$

$$a_y = C_4 A_x + C_5 A_y + C_6 A_z - g \sin\gamma_y \quad (4)$$

$$a_z = C_7 A_x + C_8 A_y + C_9 A_z - g \cos\gamma_x \cos\gamma_y \quad (5)$$

where the $C_1$–$C_9$ are transformation coefficients that are determined from the output signals generated by rotation sensors. These signals represent, for example, the angles or incremental changes of the angles that are shown in FIG. 5. The angles may be determined from rotation sensors that provide signals corresponding to rotation angles of the embodiment. These rotation sensors may comprise rotation accelerometers or rotation rate sensors. In accordance with another embodiment of the invention, rotation angles are measured by magnetic field sensors, also referred to as magnetometers, operating in conjunction with gravity tilt sensors as explained later with reference to FIG. 13 and 16.

Since linear accelerometers also record gravity, it is necessary to keep track of the contribution of gravity to the accelerometers and remove it from measurements. The values for $\gamma_x$ and $\gamma_y$ may be determined at the initiation of each step, and are substantially equal to zero for a substantially horizontal surface. At this time the proportion of gravity recorded by the accelerometers is related, among other things, to the angle from the vertical coordinate (as resolved by an accelerometer such as the ADXL05, from Analog Devices).

$$\gamma_x = \sin^{-1}(A_x/g) \quad (6)$$

$$\gamma_y = \sin^{-1}(A_y/g) \quad (7)$$

It is not necessary to know the values of $\gamma_x$ and $\gamma_y$ to determine the contribution of gravity. Since the reference and translational coordinate systems are aligned at the initiation of a cycle, the component of gravity at the initiation of a cycle is just the value of the accelerometer readings at that time, $A°_x$, $A°_y$, $A°_z$. These terms involving gravity g can be used to correct for the effect of gravity on the linear accelerometers, and will be described further below.

There are several methods established in prior art to determine the values of the coefficients $C_1$–$C_9$, such as described by, Titterton, D. H. and Weston, J. L. *Strapdown Inertial Navigation Technology.* Peter Peregrins Ltd publisher, 1997; Britting, Kenneth R. *Inertial Navigation Systems Analysis,* Wiley-Interscience, a Division of John Wiley & Sons, Inc. (1971 Library of Congress no. 70-168635) and incorporated herein by reference; Goldstein, Herbert *Classical Mechanics,* ch. 4, Addison Wesley Publishing, Reading Massachusetts (1956) Van Bronkhorst, A. *Euler Angle Strapped-Down Computer,* Advisory Group for Aerospace Research and Development (AGARD), Inertial Navigation Systems and Components, North Atlantic Treaty Organization (May 1968).

In accordance with one embodiment of the invention, one solution for the coefficients $C_1$–$C_9$ is obtained from incremental rotations $\partial\theta$, as described here. Since rotation is not a vector quantity, it is necessary to develop a solution for $\partial\theta$'s, in accordance with one embodiment of the invention, which act as a vector quantity.

As explained hereinafter, the order of rotation for a measuring system that measures relatively larger angles can provide more than one solution. For example, the rotations individually about the three axes of a left-hand coordinate system shown in FIG. 5 is explained more fully below. To this end, the transformation to the reference frame after a rotation about the Z axis is:

$$Z^{-1} = \begin{vmatrix} \cos\theta_z & -\sin\theta_z & 0 \\ \sin\theta_z & \cos\theta_z & 0 \\ 0 & 0 & 1 \end{vmatrix} \quad (8)$$

Where $Z^{-1}$ is referred to as a transformation matrix that transfers the coordinates from the translational frame to the reference frame. The transformation to the reference frame after a rotation about the Y axis is:

$$Y^{-1} = \begin{vmatrix} \cos\theta_y & 0 & \sin\theta_y \\ 0 & 1 & 0 \\ -\sin\theta_y & 0 & \cos\theta_y \end{vmatrix} \quad (9)$$

Where $Y^{-1}$ is referred to as a transformation matrix that transfers the coordinates from the translational frame to the reference frame. The transformation to the reference frame after a rotation about the X axis is:

$$X^{-1} = \begin{vmatrix} 1 & 0 & 0 \\ 0 & \cos\theta_x & -\sin\theta_x \\ 0 & \sin\theta_x & \cos\theta_x \end{vmatrix} \quad (10)$$

Where $X^{-1}$ is referred to as a transformation matrix that transfers the coordinates from the translational frame to the reference frame. In order to transfer the coordinates of an object's movement in a 3D space, to a reference frame, it is necessary to multiply the transformation matrices described in reference with equations (8), (9), and (10). However, the order of rotation matters and the multiplication of the transformation matrices in different order will result in a different transformation matrix. Therefore a unique solution to the problem cannot be obtained by using whole angles in this manner.

For instance, for transforming acceleration measurements using an order of transformation defined by $[Z^{-1}Y^{-1}X^{-1}]$ will result in a 3×3 transformation from the translational frame to transform acceleration signals $(A_x, A_y, A_z)$ to the acceleration signals $(a_x, a_y, a_z)$ in the reference frame.

In that case, equations (3), (4) and (5) can be written as $$[a_x, a_y, a_z]^T = Z^{-1}Y^{-1}X^{-1}[A_x, A_y, A_z]^T - [A^o{}_x, A^o{}_y, A^o{}_z]^T \quad (11)$$

where, $Z^{-1}\,Y^{-1}\,X^{-1} =$ $$Z^{-1}Y^{-1}X^{-1} = \begin{vmatrix} \cos\theta_y\cos\theta_z & -\cos\theta_x\sin\theta_z + \sin\theta_x\sin\theta_y\cos\theta_z & \sin\theta_x\sin\theta_z + \cos\theta_x\sin\theta_y\cos\theta_z \\ \cos\theta_y\sin\theta_z & \cos\theta_x\cos\theta_z + \sin\theta_x\sin\theta_y\sin\theta_z & -\sin\theta_x\cos\theta_z + \cos\theta_x\sin\theta_y\sin\theta_z \\ -\sin\theta_y & \sin\theta_x\cos\theta_y & \cos\theta_x\cos\theta_y \end{vmatrix} \quad (12)$$

Preferably, if a small angle approximation is made such that $$\cos d\theta = 1 \text{ and } \sin(d\theta) = d\theta \text{ and, } (d\theta \times d\theta) \approx 0, \quad (I)$$

then the equations for acceleration in the reference frame obtained from accelerations in the translational frame can be expressed as:

$$a_x = A_x - A_y \partial\theta_z + A_z \partial\theta_y - A^o{}_x \quad (13)$$

$$a_y = A_x \partial\theta_z + A_y - A_z \partial\theta_x - A^o{}_y \quad (14)$$

$$a_z = -A_x \partial\theta_y + A_y \partial\theta_x + A_z - A^o{}_z \quad (15)$$

It is noted that any transformation order for multiplying the rotation matrices will result in the same incremental rotation matrix, so that the rotations of the transformation matrix act as a vector quantity and the solution is unique. The recorded values $A^o$ are used to correct for gravity as described above.

Advantageously, the computational steps start with the initiation of a cycle. In order to measure only the gravitational field the accelerometers may be substantially influenced by gravity and not by acceleration due to motion. Preferably, the initiation of a cycle is a time when the velocity of the sensors is constant. In the shoe embodiment, the shoe is stationary on the ground between each step and the velocity is zero. An additional constraint can be imposed:

$$A^o{}_x{}^2 + A^o{}_y{}^2 + A^o{}_z{}^2 = g^2 \quad (16)$$

Thus, in accordance with one embodiment of the invention the measuring system measures incremental changes of angles in a series of small time steps, such as 1/50th of a second as long as condition (I) is sufficiently met. If the transformation matrix from a translational coordinate to a reference coordinate, for rotation for the initial time step is referred to as $B^{-1}$ (obtained from the rows and columns of equations 13–15), then the acceleration vector in the reference frame is given by $$[a]^T = B^{-1}[A]^T - [A^o]^T \quad (17)$$

wherein $[\ ]^T$ denotes a transpose matrix, and transformation matrix $B^{-1}$ is defined as $$B^{-1} = \begin{vmatrix} 1 & -\partial\theta_z & \partial\theta_y \\ \partial\theta_z & 1 & -\partial\theta_x \\ -\partial\theta_y & \partial\theta_x & 1 \end{vmatrix} \quad (18)$$

In accordance with one embodiment of the invention, there are at least three ways to determine the incremental angles $\partial\theta$'s. For example, the incremental angles in one embodiment are derived based on, among other things, gravity and magnetic field sensors or magnetometers as described below. In the alternative the incremental angles are derived based among other things from rotation rate sensors (such as Hitachi HGA-V). The incremental angles can also be derived from rotation accelerometers (such as AMP model numbers ACH-04-08).

The measuring system in accordance with one embodiment of the invention continuously measures an incremental transformation matrix as a new set of incremental angles $\partial\theta$'s are measured. To this end, the initial transformation matrix $B^{-1}$ is preserved and renamed $C^{-1}$ for the next time step, and a new transformation matrix $B^{-1}$ is calculated. To transform back to the reference frame for the second time step the system calculates acceleration values in the reference frame as given by $$[a]^{-T} = C^{-1}B^{-1}[A]^{-T} - [A^o]^{-T} \quad (19)$$

For the following incremental angles, $C^{-1}B^{-1}$ is preserved and renamed $C^{-1}$ for the next time step, and a new $B^{-1}$ is calculated for the next time step. At the end of the next time step the new $C^{-1}B^{-1}$ is preserved and renamed $C^{-1}$ for the following time step. This is repeated for the entire measurement cycle.

In accordance with another embodiment of the invention, in order to assure accurate measurements, the accelerometers employed in the present invention are desired to be properly calibrated. The embodiments described herein may be conveniently calibrated in accordance with the present invention. This follows because gravity g only varies by less than 0.3% throughout the surface of the earth, and provides a substantially constant value in a direction substantially aligned towards the center of the earth. Therefore, the vertical component of accelerometer employed in accordance with the present invention must generate an acceleration signal substantially equal to gravity g when the device is stationary or moving at a constant velocity within the earth's global coordinate system. It will be appreciated that an embodiment in accordance with the present invention may be configured so as to advantageously reset the value generated by the accelerometers to substantially represent gravity g at that time. As such, the accelerometers employed in accordance with the present invention may remain substantially calibrated at all times.

Since the accelerometers and rotation sensors are connected to a timing device, their values may be known as a function of time. The horizontal and vertical displacement may then be obtained by integrating by time as they traverse the path:

$$L_x = \int\int a_x(t)dt^2 \quad (20)$$

$$L_y = \int\int a_y(t)dt^2 \quad (21)$$

$$L_z = \int\int a_z(t)dt^2 \quad (22)$$

The integration is performed twice to obtain $L_x$, $L_y$, $L_z$ shown in the equations, where the constant of integration is zero if the foot is stationary at the beginning and end of a cycle. Here, these values can be used for navigation since their orientation is known with the global reference frame. $L_z$ would be zero if the ground remained at the slope of the beginning of the step, and would be significant if a person, for example, climbed a step. To obtain the length of the step or $$L = \sqrt{L_x^2 + L_y^2 + L_z^2} \quad (23)$$

The maximum height H ascended is, $$H = \max(L_z) \quad (24)$$

If $L_z$ is not aligned with the vertical axis, the height ascended can be obtained by resolving its component in the direction of gravity, as described above.

Figure 6:
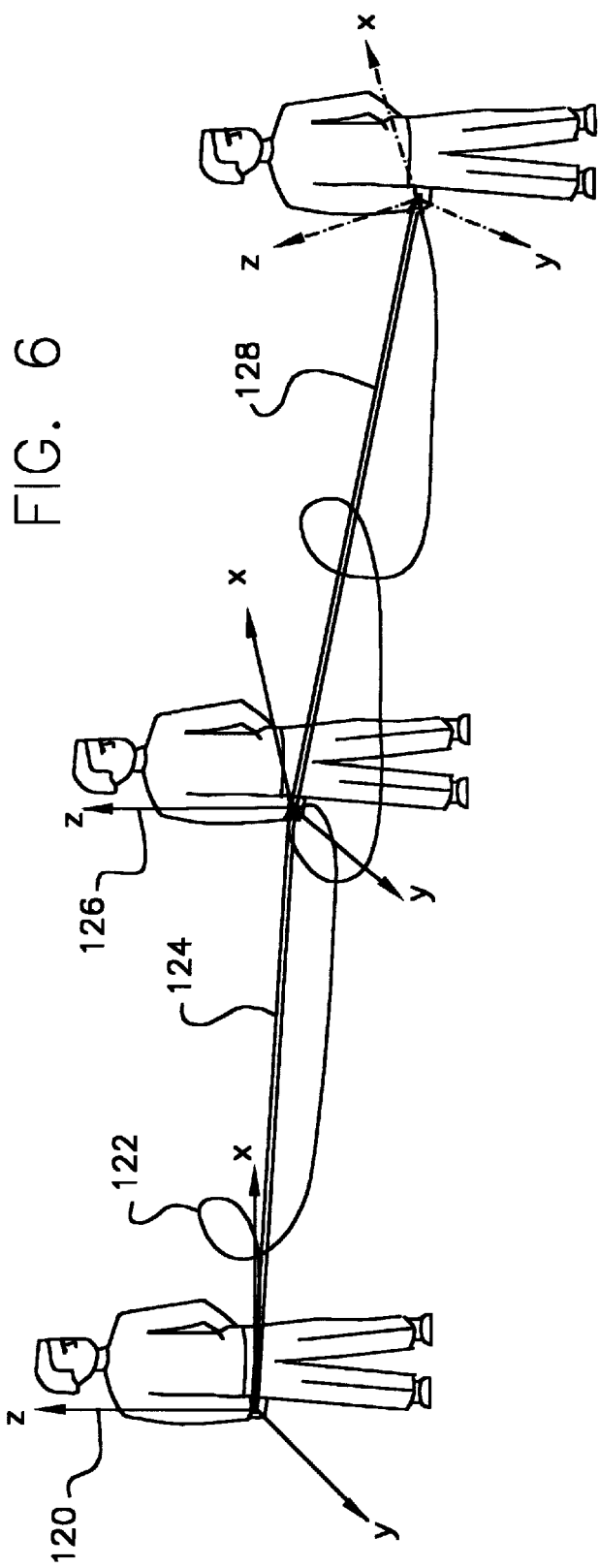
FIG. 6 illustrates the reference frame and a plot of the path of the motion of a wrist during walking or jogging, and the measurement of the distance traveled in accordance with one embodiment of the invention.

FIG. 6 illustrates the reference frame and a plot of the path of the motion of a wrist during walking or jogging, and the measurement of the distance traveled in accordance with one embodiment of the invention. A reference coordinate frame 120 is set at the initiation of a cycle, and remains fixed for the duration of the cycle. For the purposes of the present embodiment, a cycle is the period during which a new reference frame is defined and remains fixed. Preferably, the system measures the distance traveled during each cycle. As such, a cycle does not need to be related to the steps of the user or a significant distance traversed, and can include several steps. This reference frame may have a given orientation that is not necessary aligned along the gravitational field.

The motion of the wrist during a couple of cycles is traced by a thin line 122. The linear distance traveled by the wrist at the end of the first cycle is shown as a straight arrow 124. A new cycle is initiated at the same instant, with a new reference coordinate system 126. The linear distance to the position of the wrist at the end of the second cycle is shown as a straight arrow 128. The total distance traveled is the sum of distances for all cycles. The velocity of travel is the distance of the cycle, or several cycles, divided by the time it takes to travel this distance. The height jumped is not obtainable with the wrist embodiment because it is not possible to differentiate between the height jumped by the person and the vertical movement of wrist. However, in the embodiment where the measuring system is employed at the waist of the user, the height jumped is also measurable.

Figure 7:
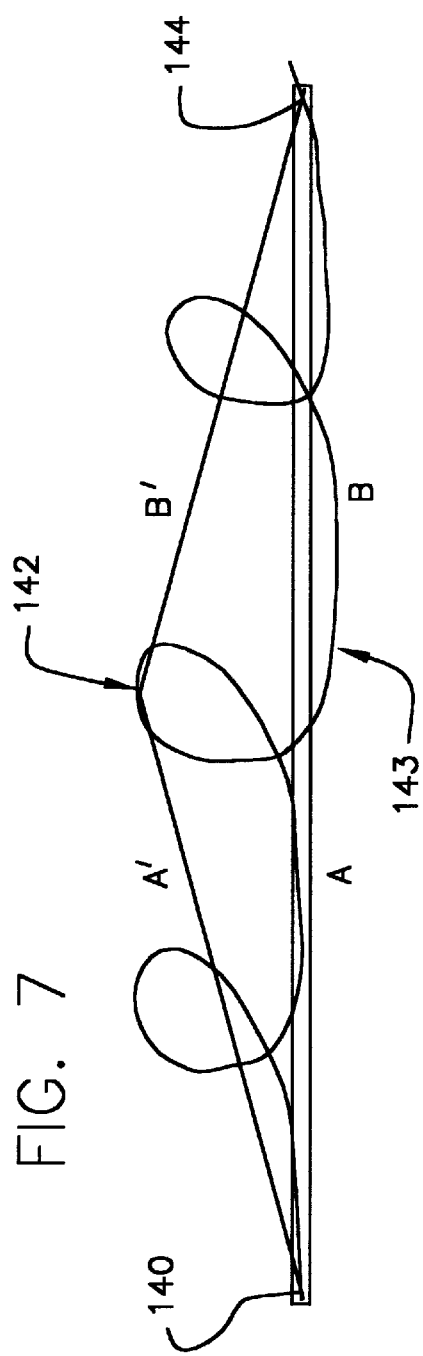
FIG. 7 illustrates a plot that explains possible errors caused by locating the measuring system in the wrist of a user.

FIG. 7 illustrates possible errors caused by locating the measuring system in the wrist of a user. The movement of the wrist may cause a systematic error due to the fact that the position of the measuring system at the beginning of a cycle may not be the same as its position at the end of a cycle. For example, if the wrist is moving in a circular, sideways, or up and down manner, the measuring system may exhibit an error as illustrated in FIG. 7. As illustrated, when the cycle starts with the wrist in position 140, and ends with the wrist in position 142, when it should have been in position 143, then the error is the difference between the distance A and A'. If during the following cycle the wrist ends in position 144, then there is another error caused by the difference between the length B and B'. However, this error is negligible for most applications. For example, if the typical distance between position 142 and 143 is 12 inches, and the lateral distance of a cycle is 200 inches, then the difference between A and A' is 1.1 inches, which is approximately a 0.5% error.

The error caused by erratic motions of the wrist is systematic as the distance between A' is always longer than or equal to A, or B' is always longer than or equal to B. The error depends upon the number of steps taken during a cycle.

A random error may occur due to the fact that a cycle begins or ends such that the wrist is forward or behind the person. In such a circumstance the error may be averaged out in following cycles. Thus, a series of cycles is used to calculate overall distance in order to average out random errors. As a result it is desirable to determine the length of a cycle that minimizes systematic errors yet allows enough cycles to average out random error. In one embodiment of the invention, this length is obtained by testing.

Figure 8:
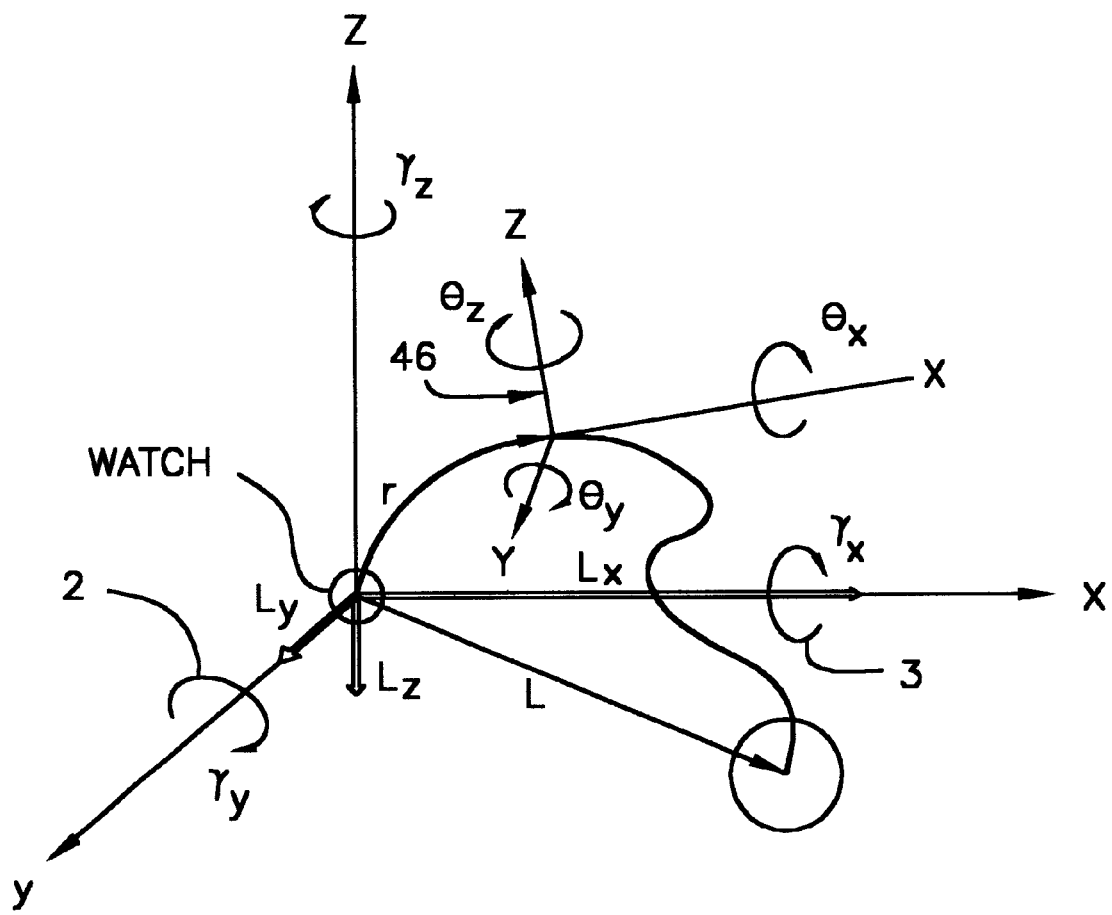
FIG. 8 illustrates the coordinate system utilized to measure the distance traveled by a user employing the measuring system in the wrist or other areas of the body.

FIG. 8 shows an exemplary coordinate systems employed to obtain a solution for the distance traveled by a person who employs the measuring system of the present invention at a wrist or a waist. As illustrated, FIG. 8 represents the same parameters as discussed with reference to FIG. 5, except that the distance traveled is measured from the wrist or the waist of the user rather than the shoe of the user. At the initiation of a cycle the reference frame is set along a given orientation. The reference frame remains fixed for the entire period of a cycle.

As mentioned before, a new reference frame is defined at the beginning of each cycle. Preferably, each new cycle begins when the accelerometers are substantially influenced by gravity and not by the acceleration of the measuring device itself. To this end, the components of gravity acting on the three accelerometers of the measuring device at the initiation of each cycle is advantageously the value of the accelerometer readings $A^o_x$, $A^o_y$, and $A^o_z$ are due to gravity, such that $$A^o_x{}^2 + A^o_y{}^2 + A^o_z{}^2 = g^2 \quad (25)$$

It is noted that the system takes into account the effects of gravity at the beginning of each cycle as set forth by equation (25) due to the fact that the accelerometers employed in a preferred embodiment of the invention are forced balance accelerometers that operate based on inertial mass effects. Thus, preferably a distinction is made between the acceleration of the user and outside acceleration due to an external force, such as gravity, acting upon the user. A forced balance accelerometer considers an external force that pulls on the inertial mass in a particular direction as if the user is accelerating in the opposite direction. As a result, the effects of gravity may be considered as if the user is accelerating with the same acceleration substantially equal to effects of gravity.

Furthermore, preferably the velocity of the measuring device at the beginning of each cycle is a constant, which indicates that the acceleration of the measuring device itself is substantially zero, so that the accelerometers are influenced substantially by the gravity and not by the acceleration of the measuring device. Thus, in accordance with one embodiment of the present invention, the system initiates a new cycle, whenever a predetermined number of velocity samples remain constant. At this time, the orientation of gravity can be determined and used to calculate the height jumped by a person.

As a result the acceleration of the measuring device along a reference frame coordinate system 76 may be obtained as follows:

$$a_x = C_1 A_x + C_2 A_y + C_3 A_z - A^o_x \quad (26)$$

$$a_y = C_4 A_x + C_5 A_y + C_6 A_z - A^o_y \quad (27)$$

$$a_z = C_7 A_x + C_8 A_y + C_9 A_z - A^o_z \quad (28)$$

Where the $C_1$–$C_9$ are transformation coefficients that are determined from the output signals as discussed above for FIG. 5. The translational coordinate system moves with the measuring system, such as the watch 78, and provides a value of $A_x$, $A_y$, $A_z$ and $\theta_x$, $\theta_y$, $\theta_z$ for determining the coefficients. The calculation of the length of travel during a cycle follows the description above in reference with FIG. 5. The length traversed by the measuring system is obtained by integrating twice to obtain Lx, Ly, and Lz:

$$L_x = \iint a_x(t)dt^2 + Tv^o_x \quad (29)$$

$$L_y = \iint a_y(t)dt^2 + Tv^o_y \quad (30)$$

$$L_z = \iint a_z(t)dt^2 + Tv^o_z \quad (31)$$

where $V^o_x$, $V^o_y$ and $V^o_z$ are the values of velocity of the sensors at the initiation of a cycle and T is the time of the cycle. Trigger is set for a time interval, after which time when $V(t)_x$, $V(t)_y$, $V(t)_z$ are constant a new cycle is started. These terms will naturally be included in the integration. So, that at the completion of the first integral the velocity at time t=0, $V^o$ will be added to the integral. Performing the second integral will result in displacement plus the velocity at time t=0 times the time interval T. It will be appreciated that at the beginning of the very first cycle, the device must be stationary so that the initial values will be known, which will be zero. To obtain the length of movement during a cycle, $$L = \sqrt{L_x^2 + L_y^2 + L_x^2} \quad (32)$$

The maximum height H jumped is, $$H = \max(L_z) \quad (33)$$

where, $L_z$ is the unit vector aligned with gravity.

Figure 16:
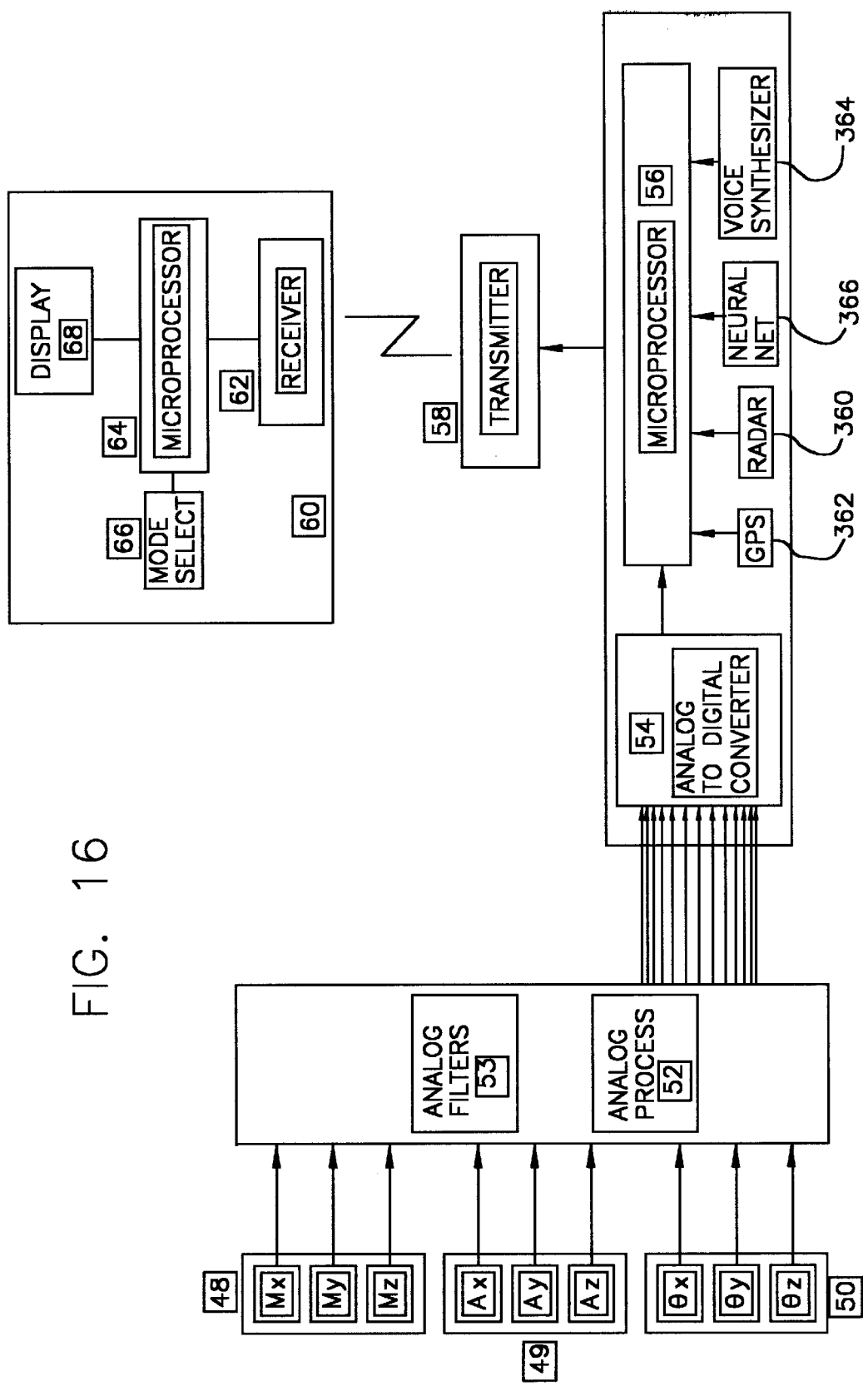
FIG. 16 is a block diagram of the electronic units necessary to solve equations for step length in accordance with the invention.

In accordance with another embodiment of the invention, the measuring system can be employed as a navigation system. It is noted that in a navigation system, the movement of an object is measured along a global coordinate system. Therefore, in addition to the reference frame and the translational frame disclosed above, the navigation system keeps track of movement within this global coordinate system. One example of a global coordinate system is the one that its z axis is aligned with gravity and further includes an x,y axis with known orientation to the magnetic North field. Thus, the translation to this global coordinate system involves a two step process. First, the reference frame of the measuring device is transformed to a gravity aligned coordinate system, such that the vertical axes is aligned with gravity. The orientation of the horizontal axes is then determined in relation with the magnetic North field. The measuring system for navigation application includes three magnetometers aligned along the same axis as linear accelerometers (FIG. 16).

Figure 9:
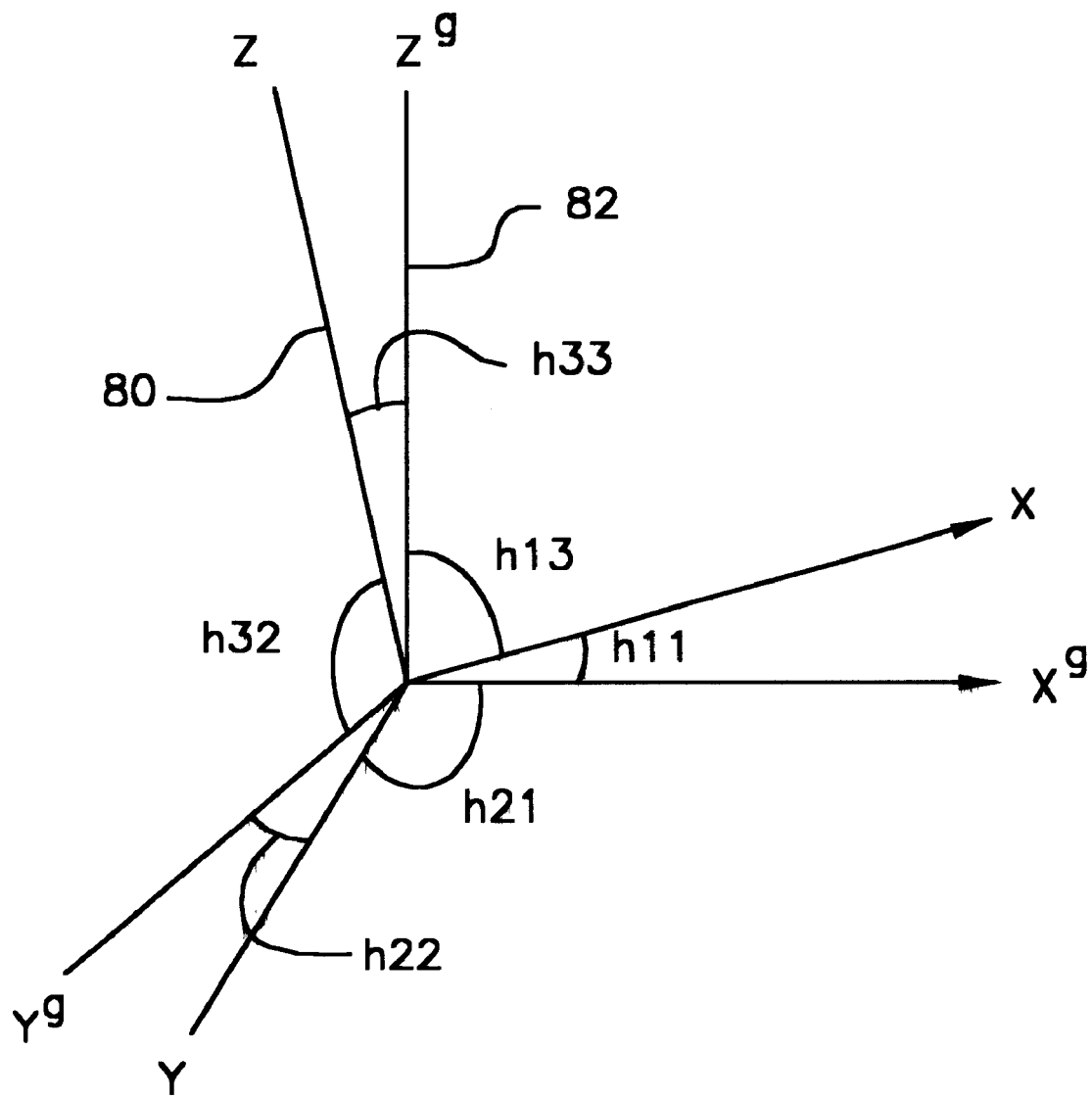
FIG. 9 illustrates how the reference frame coordinate system can be transformed to a gravity aligned reference frame.

FIG. 9 shows the components necessary to transform from the reference frame coordinate system to a gravity aligned coordinate system. It is advantageous to align the coordinate system to gravity for navigation purposes. A transformation to the gravity aligned coordinate system can be achieved by multiplying the results obtained in equations (26), (27), (28) or equation (11) by a gravity aligned transformation matrix $H^{-1}$. If this is done after the first time step, it is not necessary to do it again until the cycle is restarted. At the initiation of a cycle, when $A^o_x$, $A^o_y$, $A^o_z$ are measured, the transformation matrix to a coordinate system that has one axis aligned along the gravity field can be calculated. The values of $A^o_x$, $A^o_y$, $A^o_z$ must also be transformed, which should equal (0,0,g).

From FIG. 5, the reference frame coordinate system (x,y,z) 80 shares the origin with a gravity aligned coordinate system ($x^g, y^g, x^g$) 82, but the z axis is rotated from the gravity axis. Here, gravity is shown as positive up, since an inertial accelerometer will show positive g up when standing still. In the following, the first index is from (x,y,z) relative to the second index ($x^g, y^g, z^g$). FIG. 9 shows angles for which several direction cosines are calculated, $h_{11}$, $h_{22}$, $h_{33}$, $h_{21}$, $h_{32}$, $h_{13}$, but not all nine. The direction cosine is the cosine of the angle. The direction cosine transformation matrix can be constructed from the following constraints:

$$g^2 = A^{o\,2}_x + A^{o\,2}_y + A^{o\,2}_z \qquad (34)$$

$$h_{33} = A^o_z/g \qquad (35)$$

$z^g$, $x^g$, and x are in the same plane, then $$h_{12} = 0 \qquad (36)$$

the transformation matrix is scew symmetric, therefore $$h_{13} = -h_{31};\ -h_{12} = h_{21};\ \text{and}\ -h_{23} = h_{32} \qquad (37)$$

$$h_{13} = A_x/g \qquad (38)$$

from orthogonality conditions:

$$h_{11}^2 + h_{12}^2 + h_{13}^2 = 1;\ h_{21}^2 + h_{22}^2 + h_{23}^2 = 1;\ \text{and}\ h_{31}^2 + h_{32}^2 + h_{33}^2 = 1$$

$$h_{11}h_{12} + h_{11}h_{13} + h_{12}h_{11} + h_{12}h_{13} + h_{13}h_{11} + h_{13}h_{12} = 0$$

$$h_{21}h_{22} + h_{21}h_{23} + h_{22}h_{11} + h_{22}h_{23} + h_{23}h_{21} + h_{23}h_{22} = 0$$

$$h_{31}h_{32} + h_{31}h_{33} + h_{32}h_{31} + h_{32}h_{33} + h_{33}h_{31} + h_{33}h_{32} = 0$$

Then, the direction cosines to transfer from inertial to gravity reference frame is $H^{-1}$:

$$h_{11} = \text{sqrt}[1 - A^{o2}_x/g^2] \qquad (39)$$

$$h_{12} = 0 \qquad (40)$$

$$h_{13} = A^o_x/g \qquad (41)$$

$$h_{21} = 0 \qquad (42)$$

$$h_{22} = \text{sqrt}[1 - A^{o2}_y/g^2] \qquad (43)$$

$$h_{23} = A^o_y/g \qquad (44)$$

$$h_{31} = -A^o_x/g \qquad (45)$$

$$h_{32} = -A^o_y/g \qquad (46)$$

$$h_{33} = A^o_z/g \qquad (47)$$

So, that in reference with discussions relating equation (19), for the initial time step:

$$C^{-1} = H^{-1} B^{-1} \qquad (48)$$

and $$[A^o]^g = H^{-1}[A^o] \qquad (49)$$

wherein $[\ ]^g$ denotes values in the global coordinate system. Transformation to gravity aligned frame only needs to be carried out for the first time step in each new cycle. Furthermore, in the gravity aligned coordinate system the height of one cycle, i.e. height ascended, or the overall elevation achieved can be calculated.

Figure 10:
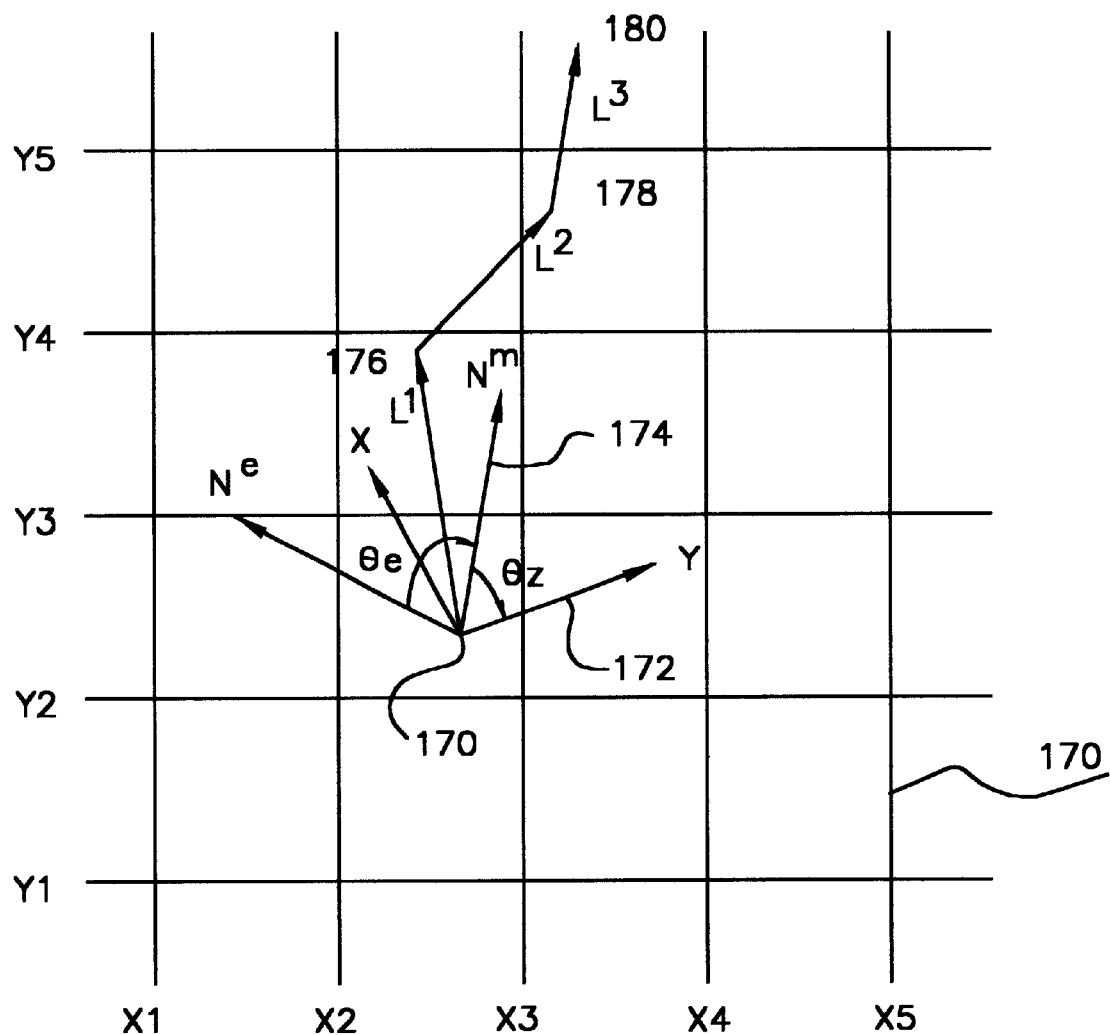
FIG. 10 illustrates how the measuring system may be used for navigation.

FIG. 10 illustrates how the measuring device is used for navigation in accordance with one embodiment of the present invention. A global coordinate system is utilized that remains fixed over time and never changes, such as an earth coordinate system or a grid within a golf course or a city. A grid with values in one direction of x1, x2, x3, x4, x5, and x6, and values in an orthogonal direction of y1, y2, y3, y4, y5 and y6 is shown 168. The third component of motion is aligned along an axis perpendicular to FIG. 10 and is discussed below. Also, for convenience, the third component of direction is assumed to be in the direction of gravity, so that transformations as described for equations 48–49 above have occurred. If a global coordinate system is used that is not aligned with the earth's, then its orientation with respect to the earth needs to be known and a transformation such as for equations 48 and 49 needs to be made.

At the beginning of a navigation session the position of the device is determined within the global coordinate system 170 and a reference frame coordinate system 172 is established for the first cycle. The orientation of the reference frame coordinate system is initially unknown and can be any orientation. As discussed before, for this system, magnetometers are utilized. The horizontal components of the magnetometers provide the angle $\theta_z$ 176 from magnetic north $N^M$ 174. To this end, $\theta_z$ is given by $$\theta_z = \arctan(M_x/M_y) \qquad (50)$$

where, M is the strength of the magnetic field in the horizontal plane and equation 50 is used to obtain a transformation to the global coordinate orientation aligned with the magnetic field.

If it is desired to navigate within a global coordinate system not aligned with the magnetic field, it is necessary to know the orientation of the new global coordinate system. For example, when the global coordinate system is defined as an earth coordinate system, a correction to the angle from the earth's North coordinate $\theta_e$, or to a grid can be made if the angle between this and the magnetic field orientation is known. Then, $\theta'_z = \theta_e + \theta_z$. The initial location within the global coordinate system may be determined from a GPS system, obtained from a radio transmission, or entered in directly by hand.

Then, $$[A^o]' = Z^{-1} H^{-1}[A^o] \qquad (51)$$

where $Z^{-1}$ is referred to as a transformation matrix that transforms the gravity aligned reference frame to the global coordinate system, $H^{-1}$ is referred to as a transformation matrix that transforms the reference frame to the gravity aligned reference frame.

And after the initial time step:

$$C^{-1} = Z^{-1} H^{-1} B^{-1} \qquad (52)$$

After the initial time step, the system continues as described previously for equations 26–31, utilizing $[A^o]'$. The position vector after completion of the first cycle $L^1$ 176 is shown. Each additional cycle will provide a position vector from the absolute determined at the end of the previous cycle. Results from two additional cycles $L^2$ 178 and $L^3$ 180 are shown.

In accordance with one embodiment of the invention, the measuring system employs a GPS receive to indicate the location when the user has begun navigation. In the alternative, the measuring system operates with a GPS system to update GPS readings. The Global Positioning System (GPS) receivers are not able to obtain satellite signals when direct line-of-sight is blocked, such as by trees, mountains, buildings, or indoor. The periods when signals are lost, called dropouts, do not allow for accurate navigation. Further, GPS is specified to be accurate within 100 meters 90% of the time. This level of accuracy is insufficient for identifying details of navigation, such as the path an individual takes throughout a city. However, if GPS is coupled with the device, then coordinate position on the earth can be obtained by GPS and the device can obtain details of navigation; periodic updates of coordinates can be obtained with the GPS.

The full navigation sequence is now described:

1) Initialize the device: For this step, the measuring system has to be stationary, $V^o_x$, $V^o_y$, $V^o_z$ are zero, and the values of $A^o_x$, $A^o_y$, $A^o_z$ are preserved. The orientation of gravity is determined and the gravity transformation matrix $H^{-1}$ from the reference frame is computed. The transformation matrix $Z^{-1}$ for the global coordinate system is also computed. The position on the earth is obtained by GPS, or programmed into the device.

2) After the first time increment of the cycle a matrix $B^{-1}$ is calculated for rotations during that increment, wherein $B^{-1}$ is a transformation matrix for transforming translational coordinate systems to the reference coordinate system, and acceleration values in the global coordinate system is calculated as $$a(t_1) = H(t_0)^{-1} Z(t_0)^{-1} B(t_1)^{-1} A(t_1) - H(t_0)^{-1} Z(t_0)^{-1} A^o(t_0)$$

The matrix $C(t_1)^{-1} = H(t_0)^{-1} Z(t_0)^{-1} B(t_1)^{-1}$ is stored for the next time step, and $A^o(t_0)' = H(t_0)^{-1} Z(t_0)^{-1} A^o(t_0)$ and renamed as $A^o(t_0)$ for convenience.

3) After the second time step a new matrix $B^{-1}$ is calculated for rotations during that increment, and acceleration values for the second time increment is calculated as $$a(t_2) = C(t_1)^{-1} B(t_2)^{-1} A(t_2) - A^o(t_0)$$

A new matrix $C(t_2)^{-1} = C(t_1)^{-1} B(t_2)^{-1}$ is preserved for the next time step. This is repeated for all the time increments of each cycle.

4) The process continues until the trigger time is reached, and the search for a trigger opportunity starts. For example, when some number of successive samples of $V(t)_x$, $V(t)_y$, and $V(t)_z$ are constant, trigger occurs and a new cycle is initiated. The values of $A^o_x$, $A^o_y$, and $A^o_z$ and $V^o_x$, $V^o_y$, and $V^o_z$ at that time are preserved for the next cycle. The time interval of the last cycle, T, is recorded. Equations as described for FIG. 8 are calculated for the length traveled during the cycle and the height jumped. The velocity is the L/T or the sum of L's/T's of some number of previous cycles. Cycles are short enough that only L is only approximately 0.5 to 2.0 meters. A straight-line travel between increments is assumed. It is noted that for each new cycle, transformation matrix $H^{-1}$ and $Z^{-1}$ is recalculated.

5) The x and y component give the direction of travel. The navigational position is obtained by keeping track of the change of position in the earth's coordinate system or a grid system, such as within a city.

6) The direction of travel relative to the magnetic field is obtained from the magnetic sensor reading in the earth's coordinate system.

7) This process continues and the path of a person, animal, or object is calculated. Periodic updates with GPS can be utilized to improve the accuracy of position within the earth's coordinate system or a local grid system.

8) The details of navigation can be stored in memory to be downloaded into a computer for display or analysis.

9) The overall distance traveled, velocity at any time, elevation change, or height of any one cycle can be determined and displayed.

Figure 11:
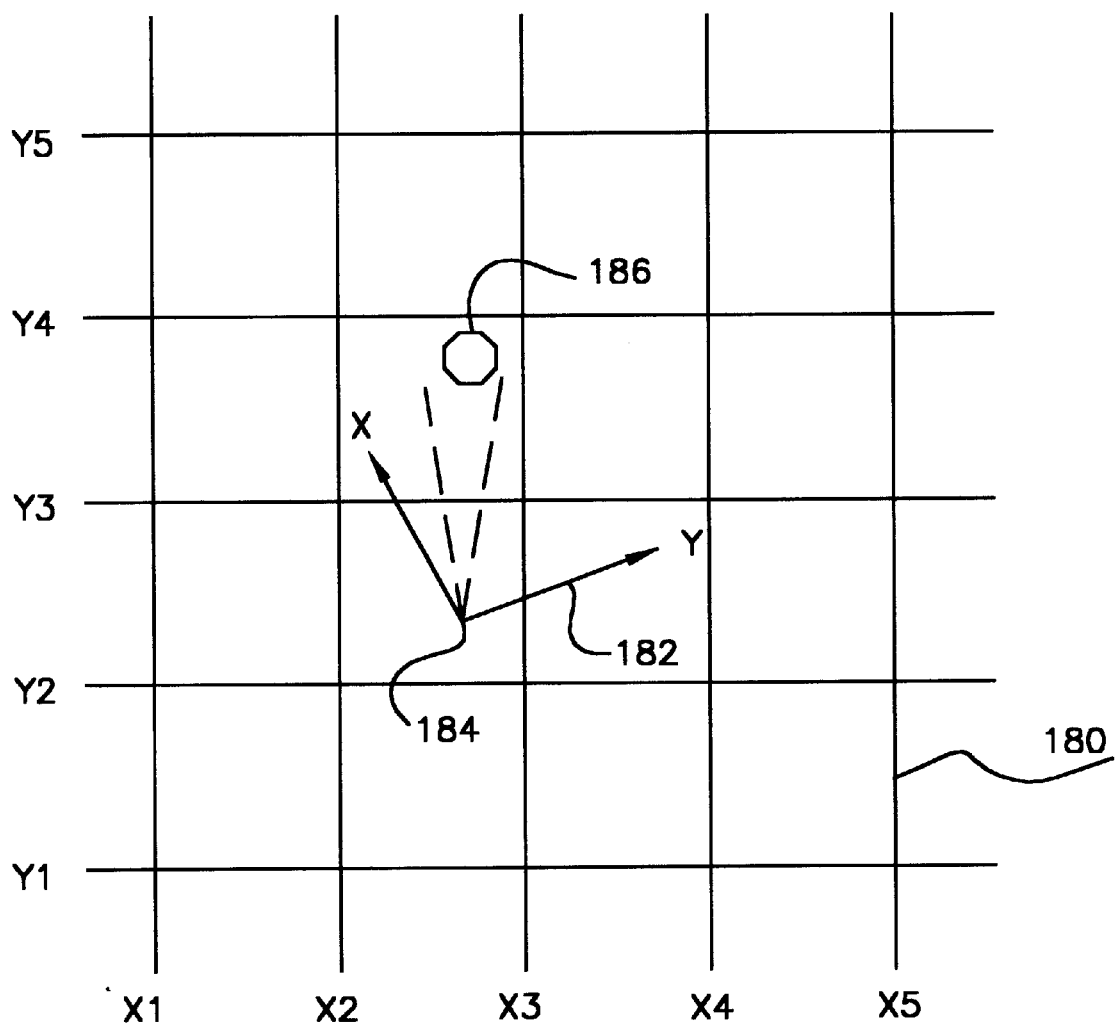
FIG. 11 illustrates how the measuring system may be used to navigate around objects.

FIG. 11 illustrates how the measuring system can use radar 360 (FIG. 16) to navigate around objects. A radar system such as the Micropower Impulse Radar System ("Radar on a Chip") MIRS is adjusted for aperture range and distance range to identify objects along a potential path of travel. For example, the MIRS can be set to identify objects within in an aperture range of 10° and a distance range of 10 feet. Analysis of signals from the MIRS can be used to identify whether an object is wood, metallic, or flesh. The same global coordinate system 180 as for FIG. 10 is used here. The MIRS is oriented in the direction of travel of a person or object, and its orientation with respect to the reference coordinate system 182 is known. The position 184 of the device at some time during travel is shown. An object 186 identified as metallic is located by radar at an angle range of +/−5 degrees and at a distance range of less than 5 to 15 feet. The absolute position of the object in the global coordinate system is determined. Either, a synthetic voice via a voice synthesizer 364, announces the position of the object, so that a person can move around the object; or, a robot or other device is given internal instructions to move in a direction around the object. Simultaneously, other objects are searched for by radar. In another embodiment the location of the object is measured in relation to the reference frame.

Figure 12:
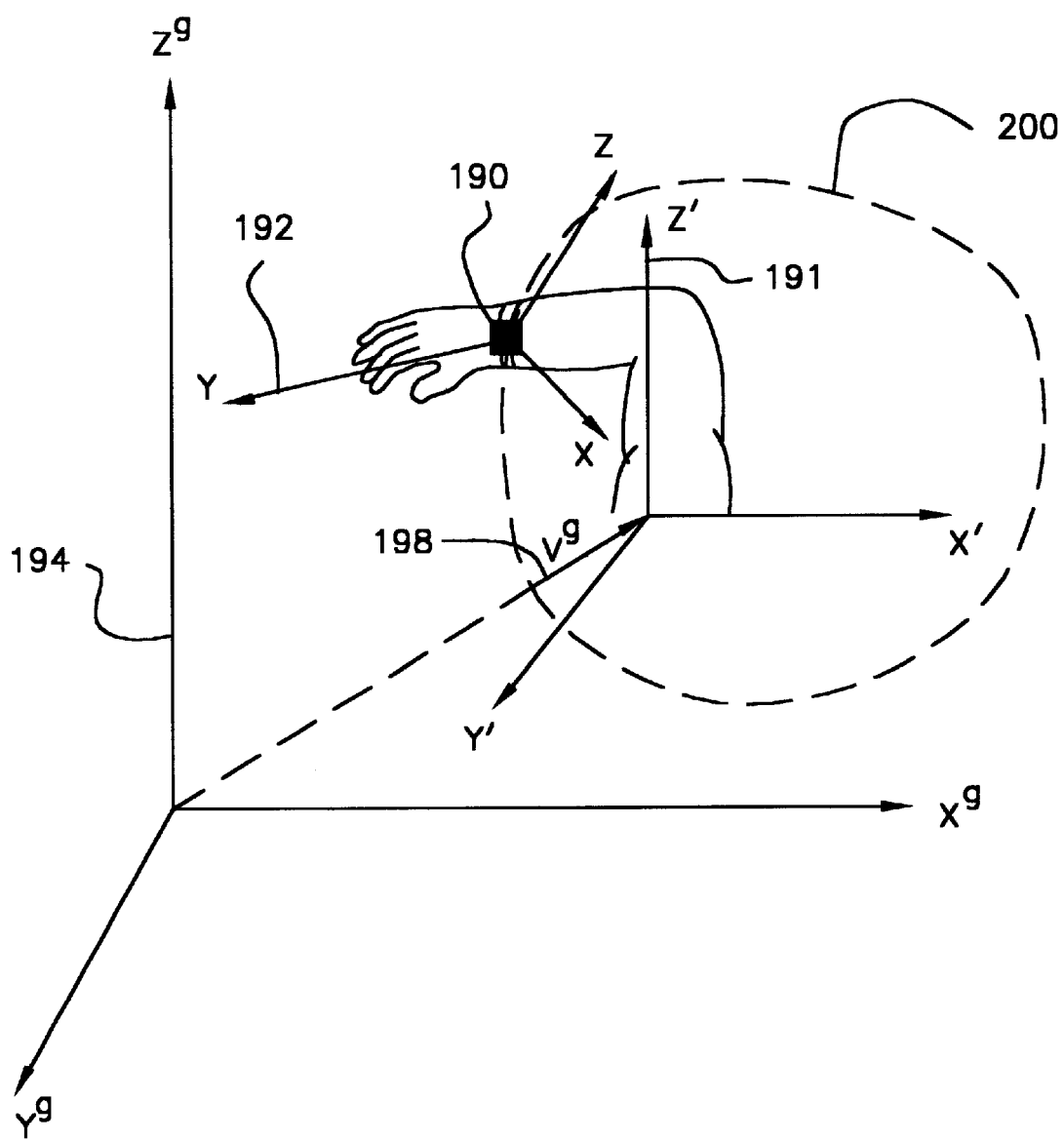
FIG. 12 illustrates how the measuring system may be used to analyze the movement of objects in three dimensions.

FIG. 12 illustrates how the measuring system may be used to analyze the movement of objects in three dimensions. For example, in accordance with another embodiment of the invention, the motion of swimmer's hand (wrist) during one swimming stroke is shown. The device is located on a swimmer's wrist 190. Motions of the wrist are measured by the translational coordinate system 192 as described above (the reference frame coordinate system for the cycle is not shown) and are transformed to a global coordinate system 194 as described above for FIG. 10. Motions of the wrist are further transformed to a coordinate system 196 that is moving with the person at a constant velocity, with an origin at the shoulder, and aligned with the global coordinate system. The velocity of the person, and thus coordinate system 196, is determined from the velocity of the person in the global coordinate system as described above; so, transformation is a subtraction of the velocity 198 of the coordinate system times the time of the measurement. Thus, the position, velocity, or acceleration of the device is known at any time throughout the cycle in coordinate system 196. Motions in this coordinate system are used to analyze the swimming stroke. The motion of the arm about the pivot point is shown as trajectory 200.

Figure 13:
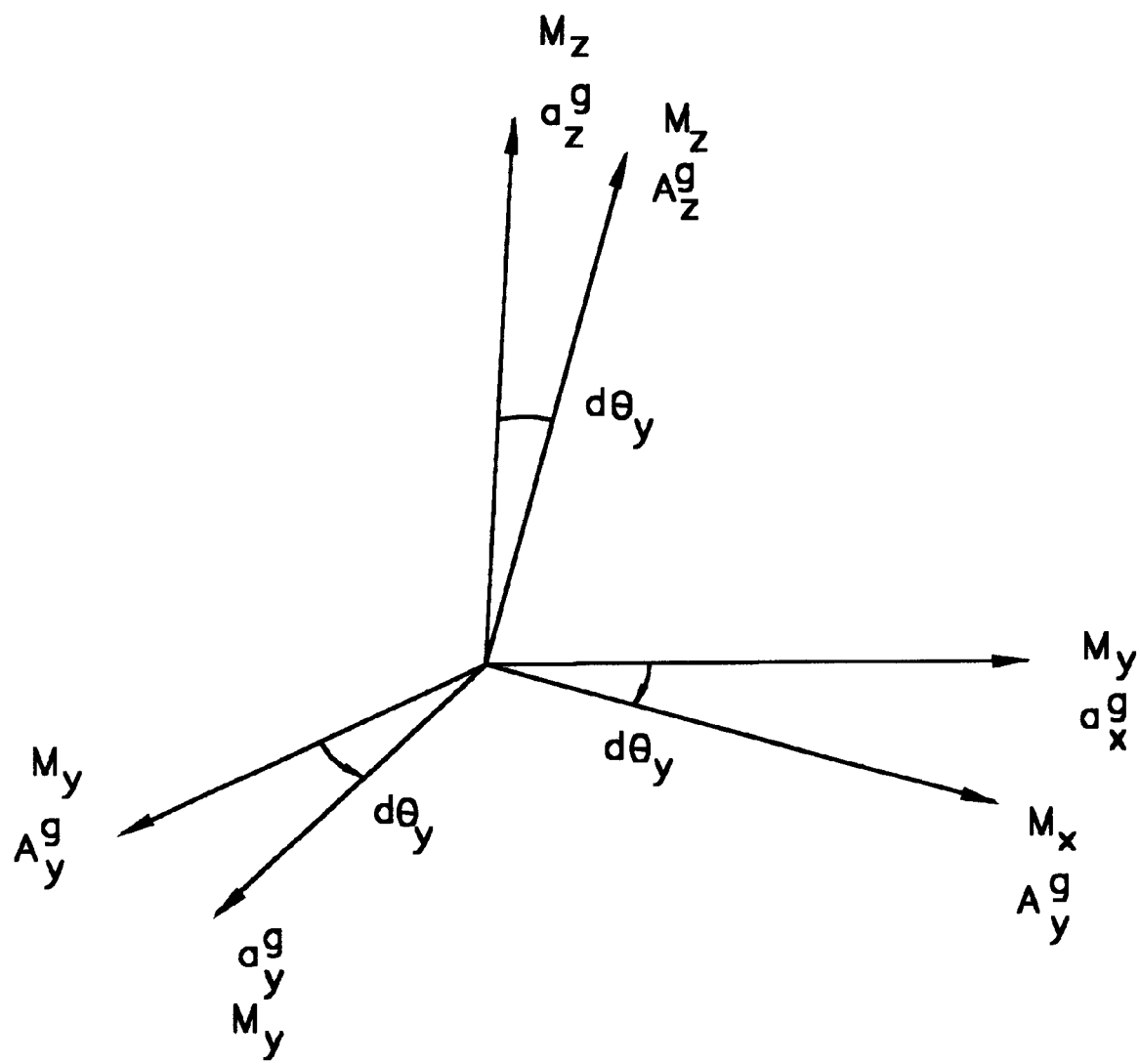
FIG. 13 illustrates how the magnetometers are used along with accelerometers that are low-pass filtered to obtain tilt measurements of gravity to calculate the rotation of the device.

FIG. 13 illustrates how the small angle change or increments derived for equation 18, can be determined from the magnetic and gravity fields as measured, by keeping track of gravity and navigation fields, employing magnetometers and linear accelerometers that provide signals that are low pass filtered at around 1 Hz. Either field alone provides insufficient information for a solution. This is because rotation about the axis of a vector has no solution for rotation angles, and any rotation (except an orientation perpendicular to the vector) has a component of its rotation along the axis of the vector. However, there is a unique solution if both fields are used simultaneously. Consider $(m_x, m_y, m_z)$ to be the magnetic field values before a rotation of an incremental angle at time t and $(M_x, M_y, M_z)$ to be the magnetic field values after an incremental change in rotation, say one time step $t + \Delta t$. Similarly, consider $(g_x, g_y, g_z)$ to be the gravity field values before a rotation of an incremental angle and $(G_x, G_y, G_z)$ to be the magnetic field values after an incremental change in rotation.

$$m_x = M_x - M_y \delta\theta_z + M_z \delta\theta_y \quad (53)$$

$$m_y = M_x \delta\theta_z + M_y - M_z \delta\theta_x \quad (54)$$

$$m_z = -M_x \delta\theta_y + M_y \delta\theta_x + M_z \quad (55)$$

$$g_x = G_x - G_y \delta\theta_z + G_z \delta\theta_y \quad (56)$$

$$g_y = G_x \delta\theta_z + G_y - G_z \delta\theta_x \quad (57)$$

$$g_z = -G_x \delta\theta_y + G_y \delta\theta_x + G_z \quad (58)$$

If one simply combines similar equations (i.e. equations 53 and 56, 54 and 57, and 55 and 58), then one obtains a scew symetric matrix operator for the $\delta\theta$'s, and one should be able to solve directly for the $\delta\theta$'s. However, the matrix is indeterminate and a direct solution is not possible.

These six equations with three unknowns, however, can be solved by linear least squares inversion, yielding the best average fit to all the observations. The equations can be expressed in matrix form as:

$$[B]c = d \quad (59)$$

where, B is the matrix of coefficients for the $d\theta$'s, c is the vector of $\delta\theta$'s and d is their product. This is expressed as:

$$\begin{vmatrix} 0 & M_z/M & -M_y/M \\ -M_z/M & 0 & M_x/M \\ M_y/M & -M_x/M & 0 \\ 0 & G_z/G & -G_y/G \\ -G_z/G & 0 & G_x/G \\ G_y/G & -G_x/G & 0 \end{vmatrix} \cdot \begin{vmatrix} \delta\theta_x \\ \delta\theta_y \\ \delta\theta_z \end{vmatrix} = \begin{vmatrix} (m_x - M_x)/M \\ (m_y - M_y)/M \\ (m_z - M_z)/M \\ (g_x - G_x)/G \\ (g_y - G_y)/G \\ (g_y - G_y)/G \end{vmatrix} \quad (60)$$

Where G and M are the total magnetic and gravity fields, respectively, which are calculated as the square root of the sum of their corrcorresponding components squared. They normalize the equations and remove the bias due to the two different fields. These equations have the classic solution as described in Menke, William "Geophysical Data Analysis: Discrete Inverse Theory", Academic Press, 1984 and incorporated herein by reference:

$$c = [B^T B]^{-1} B^T d \quad (61)$$

where, superscript T indicates transpose and superscript $-1$ indicates an inverse matrix. Now, it is advantageous to have the flexibility to give different weights to the magnetic and gravity portions of the solution, so that equation 61 can be expressed as:

$$c = [B^t w B]^{-1} B^T w d \quad (62)$$

wherein w is a weighting factor. In computations $w_1$ are weights for magnetic field values and $w_2$ are weights for gravity field values. Further, it is advantageous to minimize the over determined portion of the solution and maximize the under determined portion. This is achieved by a damped least-squares solution:

$$c = [B^T w B + e^2 I]^{-1} B^T w d \quad (63)$$

where I is the identity matrix, and e is the damping factor.

Then, $$B^T w B + e^2 I = \begin{matrix} b_1 & b_2 & b_3 \\ b_2 & b_4 & b_5 \\ b_3 & b_5 & b_6 \end{matrix} \quad (64)$$

$b_1 = w_1(M_z/M)^2 + w_1(M_y/M)^2 + w_2(G_z/G)^2 + w_2(G_y/G)^2 + e^2$
$b_2 = -w_1 M_x M_y / M^2 - w_2 G_x G_y / G^2$
$b_3 = -w_1 M_x M_z / M^2 - w_2 G_x G_z / G^2$
$b_4 = w_1(M_z/M)^2 + w_1(M_x/M)^2 + w_2(G_z/G)^2 + w_2(G_x/G)^2 + e^2$
$b_5 = -w_1 M_y M_z / M^2 - w_2 G_y G_z / G^2$
$b_6 = w_1(M_y/M)^2 + w_1(M_x/M)^2 + w_2(G_y/G)^2 + w_2(G_x/G)^2 + e^2$

Now, $$[B^T w B + e^2 I]^{-1} = \begin{matrix} -b_{11} b_{14}/b_{13} + b_{12} & b_9 b_{11}/b_7 b_{13} + b_2/b_1 b_7 & -b_{11}/b_{13} \\ -b_8 b_{14}/b_7 b_{13} - b_2/b_1 b_7 & b_8 b_9/b_7^2 b_{13} + 1/b_7 & -b_8/b_7 b_{13} \\ b_{14}/b_{13} & -b_9/b_7 b_{13} & 1/b_{13} \end{matrix} \quad (65)$$

where,
$b_7 = b_4 - b_2^2/b_1$
$b_8 = b_5 - b_2 b_3/b_1$
$b_9 = b_6 - b_3^2/b_1$
$b_{10} = b_3/b_1 - b_8 b_2/b_1 b_7$
$b_{11} = b_9 - b_8^2/b_7$
$b_{12} = 1/b_1 + b_2^2/b_1^2 b_7$
$b_{13} = b_{12} + b_{10}^2/b_{11}$
$b_{14} = -b_2/b_1 b_7 + b_8 b_{10}/b_7 b_{11}$
$b_{15} = -b_{10}/b_{11}$
$b_{16} = 1/b_7 + b_8^2/b_7^2 b_{11}$
$b_{17} = -b_8/b_7 b_{11}$
$b_{18} = 1/b_{11}$ Also, $$B^T w d = \begin{matrix} b_{19} \\ b_{20} \\ b_{21} \end{matrix} \quad (66)$$

where,
$b_{19} = -w_1 M_z(m_y - M_y)/M + w_1 M_y(m_z - M_z)/M - w_2 G_z(g_y - G_y)/G + w_2 G_y(g_z - G_z)/G$
$b_{20} = w_1 M_z(m_x - M_x)/M - w_1 M_x(m_z - M_z)/M + w_2 G_z(g_x - G_x)/G - w_2 G_x(g_z - G_z)/G$
$b_{21} = -w_1 M_y(m_x - M_x)/M + w_1 M_x(m_y - M_y)/M - w_2 G_y(g_x - G_x)/G - w_2 G_x(g_y - G_y)/G$ finally, $$c = [B^T w B + e^2 I]^{-1} B^T w d, \quad (67)$$

so that $$\delta\theta_x = b_{13} b_{19} + b_{14} b_{20} + b_{15} b_{21} \quad (68)$$

$$\delta\theta_y = b_{14} b_{19} + b_{16} b_{20} + b_{17} b_{21} \quad (69)$$

$$\delta\theta_z = b_{15} b_{19} + b_{17} b_{20} + b_{18} b_{21} \quad (70)$$

Figure 14:
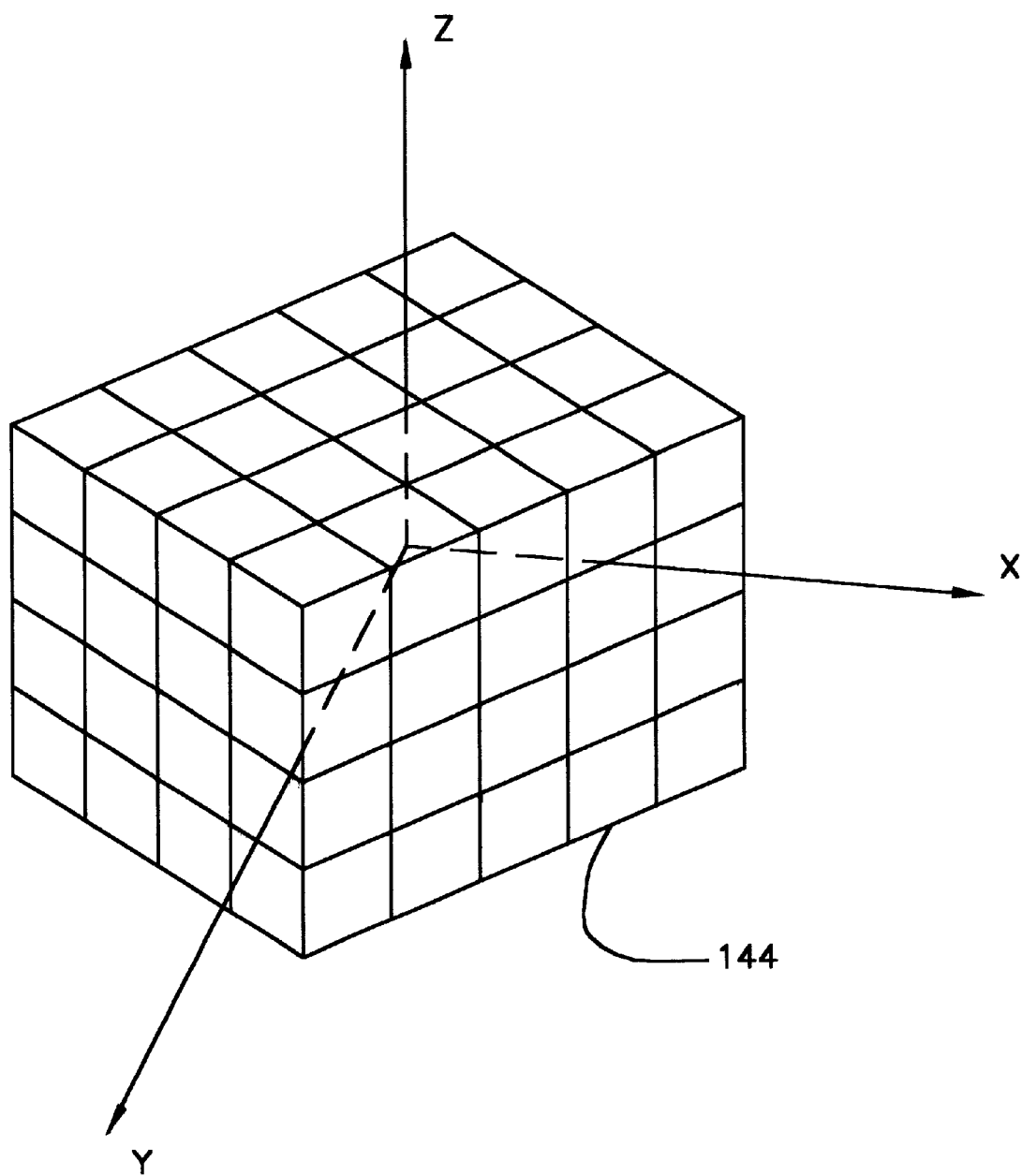
FIG. 14 illustrates how several devices are employed to provide redundant information and random errors can be averaged out.

FIG. 14 illustrates how several devices are employed to provide redundant information and random errors can be averaged out. A cluster of devices 144 all wired to the same algorithm for calculating the distance, speed, height, position, or three dimensional tracking can be used to average out random errors. In accordance with one embodiment of the invention, each device 144 comprises the arrangement of components illustrated in FIG. 16. Random errors are reduced by a factor of 1/sqrt(N), where N is the number of devices. It is noted that this embodiment is most applicable to situations where the apparent acceleration of the device is primarily due to the affect of tilt in the gravity field or the rate of tilt is at a lower frequency than the changes in linear accelerations of the device. Further, preferably the rate of tilt is much slower than the rate of change of linear accelerations and the amplitude of acceleration due to tilt is also much larger than that due to linear accelerations of the device.

Figure 15:
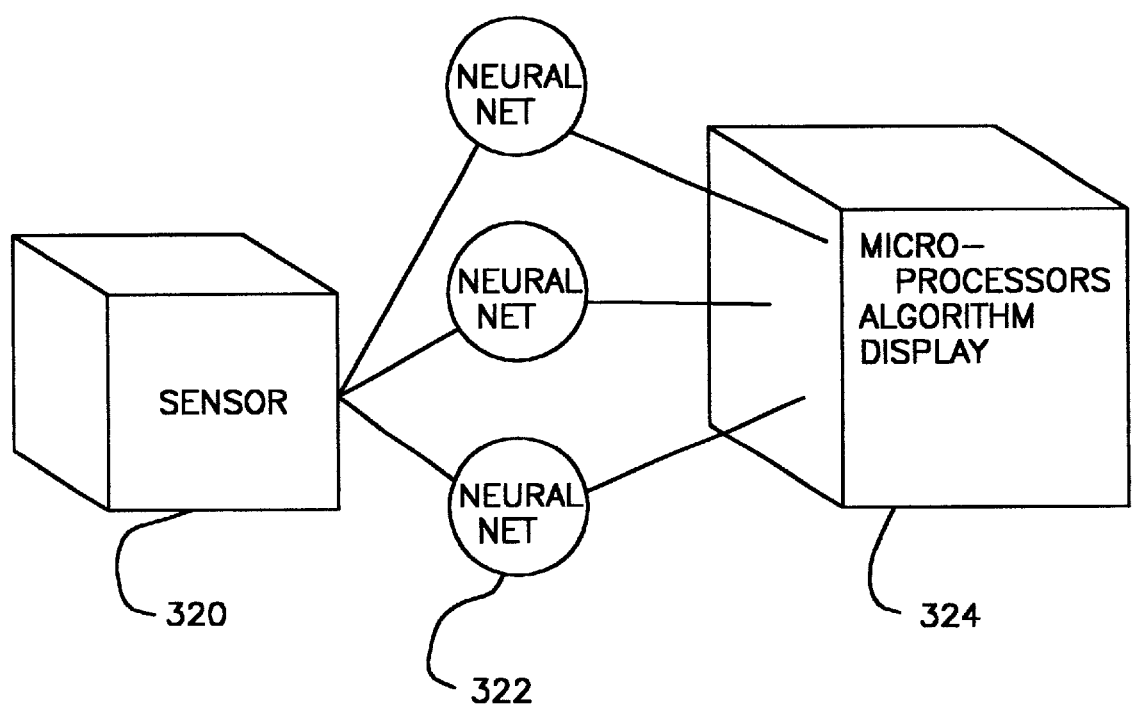
FIG. 15 illustrates how neural networks can be employed to improve accuracy.

FIG. 15 illustrates how neural networks can be employed to improve accuracy. FIG. 15 shows a neural network 322 that increases the accuracy of the computed distance or location by providing corrections input signals from the sensors 320, based on characteristics of the measured sensor inputs. The output of the nueral-net provides input into the micro-processor that calculates the distance, speed, height, position, or three dimensional tracking 324.

FIG. 16 is a block diagram of the components employed to solve the equations, although the invention is not limited in scope in this respect. Therefore, any hardware or software system configured to solve the above equations to measure the length of each cycle and the height ascended or descended may be employed. Unit 48 may preferably contain three magnetometers that can be employed to measure the magnetic field strength in three directions Mx, My, Mz, and determine direction of travel and compute angular rotations.

Unit 49 may preferably contain three linear accelerometers employed to measure accelerations Ax, Ay and Az. Unit 50 may preferably contain three rotational sensors employed to measure angular rotations $\gamma_x$, $\gamma_y$ and $\gamma_z$. These components are configured to measure in three dimensions as shown for FIGS. 5 and 8. Specifically, unit 50 contains three rotational rate sensors. In the alternative, the rotational accelerometers provide angular rotational signs.

The output terminals of units 48, 49, and 50 are coupled to input terminals of a processor 52 and analog filters 53. The filters may be employed to remove high frequency signals that interfere with accuracy. In addition, the linear accelerometer signals may be separated into six channels: three low passed filtered at a range, say 40 Hz, to remove high frequency noise, and three low pass filtered at a range, say 1 Hz, to provide a signal that is commensurate with tilt of the device. This results in a twelve degree of freedom system. Processor 52 may be employed to make the calculations necessary to control the removal of instrument constants from the signals and to direct them to the analog to digital converter 54. In accordance with another embodiment of the invention, processor 52 may process the analog signals for calculating equations 23–25 and 49–50.

Microprocessor 56 is coupled to a GPS device 362, a voice synthesis and alarm device 364, a radar chip 360, and a neural network 366. As discussed above, microprocessor 56 operates the algorithm for navigation, three dimensional tracking and computes speed and distance. It receives signals from various units such as 360, 362, 364 and 366 to perform its calculation steps. Furthermore, microprocessor 56 contain algorithms to solve the equations described above and further prepare signals for the transmitter 58.

Microprocessor 56 is preferably configured to measure the distance L traversed during each cycle and the maximum height H ascended or descended during that cycle. Unit 56 decides when to restart the calculation for the next step. It will be appreciated that these measurements may be employed in either analog or digital format.

The transmitter includes a means for encoding the output of unit 54 into a transmitted signal. The transmitter may operate on any frequency selected from 1 to 27 MHz or 49 band using amplitude or frequency modulation. The battery supplies power to the transmitter. The transmitted signal is received and decoded by the receiver. The receiver may also be selectively tuned to receive the signals of several different transmitters operating on different frequencies so that the performance of several runners may be monitored from a remote location.

Unit 60 is the remote device, which may be located in the user's wristwatch, and contains a receiver 62, a microprocessor 64, a mode select switch 66 and a display 68. Transmitter 58 includes a means for encoding the output signals provided by a microprocessor 56 into a transmitted signal. Transmitter 58 may also be of the type already known in the art such as the RF Monolithics model HX2000. Transmitter 58 may operate on any frequency selected and use amplitude or frequency modulation. The transmitted signal from transmitter 58 is received and decoded by receiver 62. Receiver 62 may also be of the type known in the prior art such as the RF Monolithics model RX2010. Receiver 62 may also be selectively tuned to receive the signals of several different transmitters operating on different frequencies so that the performance of several runners may be monitored from a remote location. Microprocessor 64 may be selected from various microprocessors known in the prior art, such as Motorola model MC68HC05L1.

A typical run mode sequence will now be described with reference to FIG. 13. Mode select unit 66 is employed at the start of the run or movement excursion by depressing an appropriate switch, not shown, which is coupled to microprocessor 64 through an input switch control logic interface. As the cycle begins, a first output signal is generated by sensors contained in units 48, 49, and 50. The device is at rest for the beginning of an excursion, then the initial accelerations will be zero and the initial velocity will be zero, equations 23–27. Units 52 and 53 prepare the signals and they are passed through unit 54 to microprocessor 56. begins to calculate the initial orientation of the device along the reference coordinates in accordance with equations.

Thereafter unit 48 generates acceleration signals along the translational coordinates. Rotational sensors contained in unit 50 begin to track the rotation of the user's foot along the translational coordinate system. Thereafter, unit 52 measures instantaneous acceleration of the foot along the reference coordinates as the foot travels in the air and contacts the surface again. Unit 54 receives these acceleration signals and unit 56 calculates the length of each step by integrating the acceleration signals. Unit 56 also calculates the height jumped by obtaining the maximum length measured along the z axis of the reference coordinate system. The output signals are coupled to RF transmitter 58 and transmitted to receiver 62. The signals received by receiver 62 are coupled to microprocessor 64. The microprocessor interface converts the output of a microprocessor to signals suitable to drive display 68.

Speed is continuously calculated by measuring the distance of each step and is instantaneously available for display. Microprocessor 64 also maintains running elapsed time. Microprocessor 64 may be configured to calculate distance traversed by summing the length of all steps taken. It may further be configured to calculate the instantaneous and the average speed of the user. The running elapsed time, the distance traversed and the speed may be selectively displayed on display 68. These values may also be stored in a non-volatile memory (not shown) associated with microprocessor 64 for virtually an indefinite period of time.

For calibration purposes, microprocessor 56 may be desirably configured to monitor the value of signals provided by accelerometers of unit 48. Whenever it is determined that the user's foot is on the running surface, the value of these signals may correspond to gravity, g. If, however, the value of the these signals does not correspond to gravity, g, microprocessor 56 may provide a feedback signal so as to reset the values of the accelerometers to provide a desired signal representing gravity, g.

In the watch mode, microprocessor 64 selectively provides to display 68, normal watch functions such as time of day, date, an alarm signal when a preselected time occurs. Obviously, many modifications and variations of the above preferred embodiment of the invention will become apparent to those skilled in the art from a reading of this disclosure. For example, a less expensive embodiment may be implemented where all electronic components are disposed on the shoe. In that case, there may be no desire for a transmitter and a receiver circuit. It may also be possible to combine the functions performed by microprocessors 56 and 64 into one microprocessor, such as a Motorola model MC68HC05L. In the alternative it is also possible to combine the functions performed by signal processor 52, and microprocessors 56 and 64 into one such microprocessor.

Obviously, many modifications and variations of the above preferred embodiment of the invention will become apparent to those skilled in the art from a reading of this disclosure. It should be realized that the invention is not limited to the particular embodiment disclosed, but its scope is intended to be governed only by the scope of the appended claims. It should be realized that the invention is not limited to the particular embodiment disclosed, but its scope is intended to be governed only by the scope of the appended claims.

It will be appreciated by those skilled in the art, that the measuring system in accordance with the present invention, may be employed in a variety of applications beyond the use for walking and jogging. For example a measuring system may be implemented for medical and biomedical applications. As such, a measuring system in accordance with the present invention is used in an orthopedic or a prosthetic device to track the durability of the device over a total distance traveled by the user. For example, in a preferred embodiment patients that undergo hip replacement surgery, employ a measuring system, either internally, for example adjacent to the replaced hip or externally, so as to measure the total distance traveled by a replaced hip. This allows physicians and engineers to collect valuable data relating to the durability and performance of the artificial hips based on the type of material used, various artificial hip designs employed or various surgical techniques used.

In accordance with another embodiment of the invention, instead of accelerometers velocity sensors may be employed. For a measuring system that employs a velocity sensor the condition set forth by equation (16) becomes unnecessary. Thus a new cycle may advantageously begin at any time the velocity of the user is constant.

In accordance with another embodiment of the invention, measuring systems that operate based on the principles of the present invention are placed on any limb or extremity of a patient to detect and diagnose range of movements of the patient, or range of motion, and compare with normal benchmarks.

In accordance with yet another embodiment of the invention a measuring device is placed in an object, such as a golf ball, in order to conveniently measure the distance and the height traversed by the ball. In another embodiment of the invention, a plurality of measuring devices may be employed within a moving object so as to measure various movements relating to each measuring device. Values measured by each measuring device may then be combined by a central processor so as to determine the movements of the measuring devices in relation to each other. For example, measuring devices may be attached to a clothing article to create a "smart" clothing article. A user advantageously wears the clothing article. Each measuring device in the clothing article tracks movement, acceleration, distance and speed for further calculations.

In another embodiment of the invention a plurality of measuring devices may be employed by a plurality of persons or objects. Each measuring device transmits information relating to its movement, acceleration, distance and speed to a centralized location so that the movement of a group of persons or objects is advantageously monitored. In addition, when it is necessary to monitor the movement of a group of animals, each measuring device is attached to an animal for further monitoring. Such a system may be advantageous for wild life preservation purposes, or in the alternative, for commercial purposes, such as cattle grazing and so forth.

In another embodiment of the invention, a measuring device operating in accordance with the principles of the present invention may be used for navigational purposes. For example, at the initiation of the system, the user's location coordinates are entered into the measuring device. The measuring device thereafter tracks the location of the movement of the user in relation to the user's initial location.

Specific uses may include attaching the device to moving objects to measure and track their movements in order to be digitized for animation, or tracking recreation devices such as golf balls or baseballs. It may also be used to measure range of motion for physical therapy and other medical measurements. It may also include navigation of a person or an object, tracking virtual movements for graphic positioning and display, analyzing motion of an instrument/tool/limb in order to evaluate performance over time and performance relative to a benchmark motion of another similar instrument/tool/limb, and other such uses.

What is claimed is:

1. A system for measuring movement characteristics of a moving object over a plurality of measurement cycles, said system comprising:
   an accelerometer unit attached to said object, said accelerometer unit configured so as to provide acceleration signals corresponding to accelerations associated with a movement of said object during said plurality of measurement cycles;
   a magnetometer unit attached to said object and configured so as to provide signals corresponding to magnetic field values within which said moving object is located;
   a processing system coupled to process sets of signals provided by said magnetometer unit and sets of signals corresponding to gravity field values within which said moving object is located based on signals provided by said accelerometer unit each said set of said magnetic field value and said gravity field value signals provided before and after an incremental change in rotation of said moving object within each one of said measurement cycles, said processing system being configured to calculate based on said gravity and magnetic field values, incremental rotation angles dθ about an axis of a three dimensional coordinate system associated with said incremental change in rotation.

2. The system in accordance with claim 1 wherein said processing system is further adapted to process said acceleration signals and said rotation angles dθ so as to measure a distance traversed and the speed of said object during each of said measurement cycles, wherein each measurement cycle begins when said object has a constant velocity.

3. The system in accordance with claim 1 wherein said processing system applies a plurality of variable weighting factors to said magnetic and gravity field values.

4. The system in accordance with claim 3 wherein said processing system applies a least-square solution to measure said incremental rotation angles dθ.

5. The system in accordance with claim 4 wherein said processing system applies a plurality of damping factors to provide a damped least-squares solution.

6. The system in accordance with claim 4 further comprising a plurality of low pass filters coupled to said acceleration unit so as to provide signals corresponding to tilt motions of said moving object.

7. The system in accordance with claim 2 wherein at initiation of each one of said cycles said acceleration signals correspond substantially to effects of gravity and during each one of said measurement cycles said system substantially subtracts acceleration signals received at initiation of each one of said cycles so as to eliminate errors caused by influence of gravity on said measuring system.

8. The system in accordance with claim 7, wherein said processing system further generates a plurality of incremental transformation matrices so as to transform characteristics of motion of said object in a translation frame system to a reference frame coordinate system.

9. The system in accordance with claim 8 wherein said accelerometer unit further comprises a calibration arrangement so as to reset the value generated by said accelerometer unit to gravity g when said measuring system is either moving at substantially constant velocity and when said measuring system is stationary.

10. The system in accordance with claim 8 wherein said processing system resets a new reference frame coordinate system at beginning of each one of said measurement cycles.

11. The measuring system in accordance with claim 10 wherein said processing system further generates a gravity aligned transformation matrix $[H^{-1}]$ so as to transform characteristics of motion of said moving object in said reference frame coordinate system to a gravity aligned coordinate system.

12. The measuring system in accordance with claim 11 wherein said processing system further generates a global frame transformation matrix $[Z^{-1}]$ so as to transform characteristics of motion of said moving object in said gravity aligned coordinate system to a global coordinate system.

13. The measuring system in accordance with claim 12 wherein said global coordinate system is aligned along earth's magnetic North.

14. The measuring system in accordance with claim 12 wherein said global coordinate system is a fixed geographic area.

15. The measuring system in accordance with claim 14, wherein said geographic area is a golf course.

16. The measuring system in accordance with claim 12, further comprising a GPS system coupled to said measuring system, wherein an initial location of said object is provided by said GPS system.

17. The measuring system in accordance with claim 12, further comprising a radar system for locating objects in the vicinity of said moving object.

18. The measuring system in accordance with claim 17 wherein said radar system is a micropower impulse radar system (MIRS) disposed on a chip.

19. A method for measuring motion characteristics of a moving object over a plurality of measurement cycles comprising the steps of:
    measuring magnetic field values associated with movement of said object;
    measuring gravity field values within which said moving object is located;
    processing sets of signals corresponding to said gravity field values and said magnetic field values, wherein said sets of signals are provided before and after an incremental change in rotation of said moving object within each of said measurement cycles, so as to calculate incremental rotation angles dθ about an axis of a three dimensional translational coordinate system associated with said incremental changes in rotation.

20. The method in accordance with claim 19 wherein said step of measuring gravity field values further comprises the steps of measuring acceleration signals associated with movement of said object along said translational coordinate system.

21. The method in accordance with claim 20 wherein said processing step further comprises the step of applying a plurality of variable weighting factors to said magnetic and gravity field values.

22. The method in accordance with claim 21 further comprising the step of measuring said incremental rotation angles dθ by applying a least-square solution.

23. The method in accordance with claim 22 further comprising the step of applying a plurality of damping factors to provide a damped least-square solution.

* * * * *

UNITED STATES PATENT AND TRADEMARK OFFICE
CERTIFICATE OF CORRECTION

PATENT NO. : 6,305,221 B1  
DATED : October 23, 2001  
INVENTOR(S) : Hutchings

It is certified that error appears in the above-identified patent and that said Letters Patent is hereby corrected as shown below:

<u>Title page,</u>  
Item [73], Assignee should read as follows:

-- [73] Assignee: Acceleron Technologies, LLC, CA --.

Signed and Sealed this

Twenty-second Day of April, 2003

JAMES E. ROGAN  
*Director of the United States Patent and Trademark Office*